United States Patent
Boudreau et al.

(10) Patent No.: US 12,556,242 B2
(45) Date of Patent: Feb. 17, 2026

(54) ONLINE MULTI-CELL COORDINATED MULTIPLE INPUT-MULTIPLE OUTPUT (MIMO) WIRELESS NETWORK VIRTUALIZATION WITH IMPERFECT CHANNEL STATE INFORMATION (CSI)

(71) Applicant: Telefonaktiebolaget LM Ericsson (publ), Stockholm (SE)

(72) Inventors: Gary Boudreau, Kanata (CA); Juncheng Wang, Toronto (CA); Ben Liang, Whitby (CA); Min Dong, Whitby (CA); Hatem Abou-Zeid, Calgary (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 144 days.

(21) Appl. No.: 18/557,341

(22) PCT Filed: Apr. 28, 2022

(86) PCT No.: PCT/IB2022/053974
§ 371 (c)(1),
(2) Date: Oct. 26, 2023

(87) PCT Pub. No.: WO2022/229908
PCT Pub. Date: Nov. 3, 2022

(65) Prior Publication Data
US 2024/0243784 A1    Jul. 18, 2024

Related U.S. Application Data

(60) Provisional application No. 63/182,094, filed on Apr. 30, 2021.

(51) Int. Cl.
H04L 1/02    (2006.01)
H04B 7/0456    (2017.01)

(52) U.S. Cl.
CPC .................. *H04B 7/0456* (2013.01)

(58) Field of Classification Search
CPC .. H04W 52/346; H04W 52/24; H04B 7/0452; H04B 7/024; H04B 7/0456;
(Continued)

(56) References Cited

U.S. PATENT DOCUMENTS

| | | | |
|---|---|---|---|
| 2011/0218001 A1* | 9/2011 | Chien | H04B 7/0639 455/501 |
| 2020/0084110 A1* | 3/2020 | Kim | G06F 9/45558 |
| 2023/0054245 A1* | 2/2023 | Wright | H04L 67/10 |

FOREIGN PATENT DOCUMENTS

WO    2020/208607 A1    10/2020

OTHER PUBLICATIONS

International Search Report and Written Opinion dated Jul. 21, 2022 issued in PCT Application No. PCT/IB2022/053974 filed Apr. 28, 2022, consisting of 21 pages.
(Continued)

*Primary Examiner* — Khai Tran
(74) *Attorney, Agent, or Firm* — Sage Patent Group

(57) ABSTRACT

A method, system and apparatus are disclosed. According to one or more Examples, an infrastructure network node (16) for providing a virtual multiple-input multiple-output. MIMO, cellular network supporting a plurality of network nodes (16) associated with a plurality of service providers. SPs is provided. The infrastructure network node (16) is configured to determine a downlink coordinated precoder for online multi-cell MIMO wireless network virtualization. WNV, where the downlink coordinated precoder is based at least on imperfect channel state information. CSI, and to optionally indicate the downlink coordinated precoder.

28 Claims, 19 Drawing Sheets

(58) Field of Classification Search
CPC ..... H04L 5/0046; H04L 41/08; H04L 9/3236; G06F 2111/18
USPC .......................................... 375/267, 260, 299
See application file for complete search history.

(56) References Cited

OTHER PUBLICATIONS

Wang et al., Distributed Coordinated Precoding for MIMO Cellular Network Virtualization; IEEE, Apr. 9, 2021, consisting of 14 pages.
Wang et al., Online Multi-Cell Coordinated MIMO Wireless Network Virtualization with Imperfect CSI; IEEE, May 17, 2021, consisting of 15 pages.
Liang et al., Wireless Network Virtualization: A Survey, Some Research Issues and Challenges; IEEE Communications Surveys & Tutorials; vol. 17, No. 1, pp. 358-380; 2015, consisting of 24 pages.
Van De Belt et al., Defining and Surveying Wireless Link Virtualization and Wireless Network Virtualization; IEEE Communications Surveys & Tutorials, vol. 19, No. 3, Third Quarter 2017, consisting of 25 pages.
Richart et al., Resource Slicing in Virtual Wireless Networks: A Survey; IEEE Transactions on Network and Service Management, vol. 13, No. 3, Sep. 2016, consisting of 15 pages.
Jumba et al., Resource Provisioning in Wireless Virtualized Networks via Massive-MIMO; IEEE Wireless Communications Letters, vol. 4, No. 3, Jun. 2015, consisting of 4 pages.
Chang et al., Energy Efficient Optimization for Wireless Virtualized Small Cell Networks With Large-Scale Multiple Antenna; IEEE Transactions on Communications, vol. 65, No. 4, Apr. 2017, consisting of 12 pages.
Zhu et al., Virtualization of 5G Cellular Networks as a Hierarchical Combinatorial Auction; IEEE Transactions on Mobile Computing, vol. 15, No. 10, Oct. 2016, consisting of 15 pages.
Parsaeefard et al., Dynamic Resource Allocation for Virtualized Wireless Networks in Massive-MIMO-Aided and Fronthaul-Limited C-Ran; IEEE Transactions on Vehicular Technology, vol. 66, No. 10, Oct. 2017, consisting of 9 pages.
Tweed et al., Dynamic Resource Allocation for Uplink MIMO NOMA VWN with Imperfect Sic; IEEE International Conference on Communications (ICC), May 2018, consisting of 6 pages.
Liu et al., Antenna Allocation and Pricing inVirtualized Massive MIMO Networks via Stackelberg Game; IEEE Transactions on Communications, vol. 66, No. 11, Nov. 2018, consisting of 15 pages.
Chowdhury et al., Network Virtualization: State of the Art and Research Challenges; Topics in Network and Service Management; IEEE Communications Magazine, Jul. 2009, consisting of 7 pages.
Soltanizadeh, et al., Power Minimization in Wireless Network Virtualization with Massive MIMO; Proceedings of International Conference on Communications Workshop on 5G Architecture (ICC 5GArch), May 2018, consisting of 6 pages.
Ngo et al., Energy and Spectral Efficiency of Very Large Multiuser MIMO Systems; IEEE Transactions on Communications, vol. 61, Apr. 2013, consisting of 15 pages.
Gesbert et al., Multi-Cell MIMO Cooperative Networks: A New Look at Interference; IEEE Journal on Selected Areas in Communications, vol. 28, No. 9, Dec. 2010, consisting of 29 pages.
Zhang et al., Asynchronous Interference Mitigation in Cooperative Base Station Systems; IEEE Transactions on Wireless Communications, vol. 7, No. 1, Jan. 2008, consisting of 11 pages.
Dahrouj et al., Coordinated Beamforming for the Multi-Cell Multi-Antenna Wireless System; IEEE Transactions on Wireless Communications, vol. 9, No. 5, May 2010, consisting of 6 pages.
Venturino et al., Coordinated Linear Beamforming in Downlink Multi-Cell Wireless Networks; IEEE Transactions on Wireless Communications, vol. 9, No. 4, Apr. 2010, consisting of 11 pages.
Cai et al., Max-Min SINR Coordinated Multipoint Downlink Transmission—Duality and Algorithms; IEEE Transactions on Signal Processing, vol. 60, No. 10, Oct. 2012, consisting of 12 pages.
Neely, Stochastic Network Optimization with Application to Communication and Queueing Systems; Morgan & Claypool, 2010, consisting of 211 pages.
Zinkevich, Online Convex Programming and Generalized Infinitesimal Gradient Ascent; Proceedings of the Twentieth International Conference on Machine Learning (ICML-2003), Washington DC, 2003, consisting of 8 pages.
Mertikopoulos et al., Learning to Be Green: Robust Energy Efficiency Maximization in Dynamic MIMO-OFDM Systems; IEEE Journal on Selected Areas in Communications, vol. 34, No. 4, Apr. 2016, consisting of 15 pages.
Mertikopoulos et al., Learning in an Uncertain World: MIMO Covariance Matrix Optimization With Imperfect Feedback; IEEE Transactions on Signal Processing vol. 64, No. 1, Jan. 2016, consisting of 14 pages.
Amirnavaei et al., Online Power Control Optimization for Wireless Transmission With Energy Harvesting and Storage; IEEE Transactions on Wireless Communications, vol. 15, No. 7, Jul. 2016, consisting of 14 pages.
Dong et al., Online Joint Power Control for Two-Hop Wireless Relay Networks With Energy Harvesting; IEEE Transactions on Signal Processing, vol. 66, No. 2, Jan. 15, 2018, consisting of 16 pages.
Wang et al., Online Downlink MIMO Wireless Network Virtualization in Fading Environments; Proceedings of Global Communications Conference (GLOBECOM), Dec. 2019, consisting of 6 pages.
Wang et al., Online Precoding Design for Downlink MIMO Wireless Network Virtualization with Imperfect CSI; Proceedings of IEEE International Conference on Computer Communications (INFOCOM), Jul. 2020, consisting of 9 pages.
Wang et al., Online MIMO Wireless Network Virtualization over Time-Varying Channels with Periodic Updates; Proceedings of IEEE International Workshop on Signal Processing Advances in Wireless Communications (SPAWC), May 2020, consisting of 5 pages.
Yu et al., Dynamic Transmit Covariance Design in MIMO Fading Systems With Unknown Channel Distributions and Inaccurate Channel State Information; IEEE Transactions on Wireless Communications, vol. 16, No. 6, Jun. 2017, consisting of 13 pages.
Wang et al., Distributed Coordinated Precoding for MIMO Cellular Network Virtualization; IEEE Transactions on Wireless Communications (submitted under review), 2021, consisting of 15 pages.
Bertsekas, Dynamic Programming and Optimal Control; Athena Scientific, 2007, consisting of 47 pages.
Holma et al., UTRAN Long-Term Evolution; WCDMA for UMTS—HSPA evolution and LTE. John Wieley & Sons, 2010, consisting of 29 pages.
Corvaja et al., Phase Noise Degradation in Massive MIMO Downlink With Zero-Forcing and Maximum Ratio Transmission Precoding; IEEE Transactions on Vehicular Technology, vol. 65, No. 10, Oct. 2016, consisting of 8 pages.

* cited by examiner

ONLINE MULTI-CELL COORDINATED MULTIPLE INPUT-MULTIPLE OUTPUT (MIMO) WIRELESS NETWORK VIRTUALIZATION WITH IMPERFECT CHANNEL STATE INFORMATION (CSI)

CROSS-REFERENCE TO RELATED APPLICATIONS

This application is a Submission Under 35 U.S.C. § 371 for U.S. National Stage Patent Application of International Application No.: PCT/IB2022/053974, filed Apr. 28, 2022 entitled "ONLINE MULTI-CELL COORDINATED MULTIPLE INPUT-MULTIPLE OUTPUT (MIMO) WIRELESS NETWORK VIRTUALIZATION WITH IMPERFECT CHANNEL STATE INFORMATION (CSI)," which claims priority to U. S. Provisional Application No.: 63/182,094, filed Apr. 30, 2021, entitled "ONLINE MULTI-CELL COORDINATED MIMO WIRELESS NETWORK VIRTUALIZATION WITH IMPERFECT CSI," the entireties of all of which are incorporated herein by reference.

FIELD

The present disclosure relates to wireless communications, and in particular, to a coordinated precoder for online multi-cell Multiple Input Multiple Output (MIMO) Wireless Network Virtualization (WNV).

BACKGROUND

Wireless Network Virtualization: WNV aims at sharing a common network infrastructure among multiple virtual networks to reduce the capital and operational expenses of wireless networks. In WNV, the infrastructure provider (InP) virtualizes the physical wireless infrastructure and radio resources into virtual slices. The service providers (SPs) lease these virtual slices and serve their subscribing wireless devices under their management and requirements. Different from wired network virtualization, WNV concerns the sharing of both the wireless hardware and the radio spectrum. The random nature and broadcast of the wireless medium bring new challenges in guaranteeing the isolation of virtual networks.

Downlink WNV in a multi-cell MIMO network may relate to a configuration where, in each cell, one InP-owned network node (e.g., base station (BS)) equipped with multiple antennas is shared by multiple SPs to serve their subscribing wireless devices. Most existing MIMO WNV studies consider strict physical isolation, where the InP allocates exclusive subsets of antennas or orthogonal sub-channels to each SP. This approach of strict physical isolation is inherited from wired network virtualization. It does not fully utilize the benefit of spatial spectrum sharing enabled by MIMO beamforming.

In contrast, in another existing study, the SPs are allowed to share all antennas and spectrum resources simultaneously. The SPs design their virtual precoding matrices as virtualization demands, based on the channel states and service needs of their wireless devices. Since the SPs are oblivious to each other, straightforward implementation of their demanded precoding matrices would induce an unacceptable amount of interference among them. Thus, the InP may be required to intelligently design the actual downlink precoding to mitigate the inter-SP interference, while satisfying the SPs' virtualization demands. It has been demonstrated in that exiting study that, with an optimally designed precoding matrix at the InP, such a spatial isolation approach substantially outperforms the strict physical isolation approach in the single-cell system.

Long-Term Transmit Power Constraint: In the existing works described above, the MIMO WNV was focused on per-slot design optimization problems subject to a short-term transmit power constraint. For the future massive MIMO system, energy consumption is a concern. The long-term average transmit power is an important indicator of energy usage.

Coordinated Precoding: Joint signal processing across multiple cells can significantly improve the system performance of a conventional single-cell network. There are two existing approaches: cooperative precoding and coordinated precoding. Cooperative precoding relates to treating antennas from multiple cells as a single antenna array, which requires signal-level coordination and global CSI sharing across the cells. In contrast, coordinated precoding only requires beamforming-level coordination.

Although offline multi-cell coordinated precoding has been extensively studied in non-virtualized wireless networks, new challenges arise for online multi-cell coordinated MIMO WNV. Specifically, since the SPs are oblivious to each other, each SP in a cell only has the CSI of its own serving users/wireless devices (in its virtual cell), without any access to the CSI of other SPs' users within the cell or users/wireless devices in the other cells. As a result, their virtual precoding demands sent to the InP do not consider either inter-SP or inter-cell interference. Thus, the InP may be required to implement the online precoder to manage the interference among different SPs and cells, while trying to meet the SPs' virtual precoding demands in the long run. This online virtualized coordinated precoding design problem is different from the traditional one in the non-virtualized scenario. Therefore, there is a need to address the unique challenges faced in this online virtualization.

Imperfect CSI: In practical wireless systems, there are unavoidable CSI errors induced by channel estimation, quantization, and imperfect feedback. This challenge is especially acute with MIMO fading channels, where the channel state space is large and the channel state can fluctuate quickly over time. Some existing MIMO WNV solutions can accommodate imperfect CSI, but they only consider its impact on the InP, thereby ignoring the impact on the SPs.

Single-Cell MIMO WNV

Among existing works on MIMO WNV that enforce strict physical isolation, two of these existing works study the problems of throughput maximization and energy minimization, respectively. Both of these works use orthogonal frequency division multiplexing under a massive MIMO setting. A two-level hierarchical auction architecture is described in another existing study to allocate exclusive sub-carriers among the SPs. The uplink resource allocation problems are investigated in two more existing studies, combining MIMO WNV with the cloud radio networks and non-orthogonal multiple access techniques, respectively. Antennas are allocated among the SPs through pricing for virtualized massive MIMO systems in another existing study. However, these existing works on MIMO WNV all focus on per-slot (i.e., offline) problems in single-cell systems.

The general Lyapunov optimization technique and online convex optimization technique have been applied to solve various online problems. For example, online projected gradient descent and matrix exponential learning are used in several existing studies for MIMO uplink covariance matrix design. Online power control for wireless transmission with energy harvesting and storage has been studied for single-hop transmission and two-hop relaying. Online single-cell MIMO WNV with accurate and inaccurate CSI has also been studied. An online periodic precoder updating method for single-cell MIMO WNV has been proposed and dynamic transmit covariance design for point-to-point MIMO systems has been studied by extending standard Lyapunov optimization to deal with inaccurate system state. Inaccurate CSI may also be referred to as imperfect CSI where the inaccurate CSI may refer to less than perfect knowledge of a channel. Inaccurate CSI may be caused by, for example, CSI estimation errors or feedback delay such that inaccurate CSI does not provide perfect knowledge of the channel.

Multi-Cell MIMO Systems

Multi-cell cooperative precoding significantly improves the system performance of wireless networks by employing cooperation among multiple network nodes for efficient inter-cell interference mitigation. However, the data streams of all wireless devices must be shared among all cooperating cells. In contrast, multiple cells are coordinated at the beamforming level. Existing coordinated precoding schemes for non-virtualized networks have focused on per-slot problems. In addition, existing coordinated precoding schemes for non-virtualized networks are of high computational complexity and require CSI exchanges or power updates across the cells through backhaul links.

SUMMARY

Some embodiments advantageously provide methods, systems, and apparatuses for coordinated precoder for online multi-cell MIMO WNV.

One or more embodiments in the present disclosure cover an extension of a previous work that is related to patent application PCT/IB2020/053022. This previous work relates to a single-cell system, while the one or more embodiments described herein related to the case of a multi-cell system.

One or more embodiments of the present disclosure address the problem of downlink coordinated precoding design for online multi-cell multiple-input multiple-output (MIMO) wireless network virtualization (WNV), with unknown channel distribution information (CDI) and imperfect channel state information (CSI). In the WNV framework, a multi-cell MIMO network owned by an Infrastructure provider (InP) is shared by several service providers (SPs) that are oblivious to each other. The SPs design their virtual MIMO transmission demands to serve their wireless devices in each cell. The InP coordinates the cells and designs the actual downlink precoding to meet the service demands from the SPs. Therefore, the impact of imperfect CSI is two-fold, on both the InP and SPs.

One goal of the present disclosure is to minimize, at the InP, the long-term time-averaged expected precoding deviation from the virtualization demand (e.g., local precoding determined by each SP), subject to both long-term and short-term transmit power constraints on each cell. One or more embodiments provide a new downlink coordinated precoding scheme for online multi-cell MIMO WNV. The coordinated precoding solution described herein leads to a fully distributed implementation at each cell, without any CSI exchange or central transmit power control. The precoding solution at each cell is in a semi-closed form, based only on the current imperfect CSI. The performance bound for the proposed online precoding scheme that is described herein is derived and shown that it is within an $O(\delta)$ gap from the optimum over any given time horizon, where $\delta$ is a normalized measure of CSI inaccuracy.

One or more embodiments described herein use the conventional terminology "cell" to define the geographic area that is covered by a single base station (BS). However, the multi-cell setting can also be referred to as the multiple-transmission-and-reception-point (multi-TRP) setting defined in Third Generation Partnership Project (3GPP) release 16.

Long-Term Transmit Power Constraint: one or more embodiments consider the optimal online design of MIMO WNV with an additional constraint on the long-term average transmit power. One objective is to design global downlink precoding at the InP to serve all wireless devices simultaneously, given the set of virtualization demands made locally by each SP to serve its respective wireless devices. The optimization criterion is the long-term time-averaged expected deviation between the received signals from the actual precoding and those demanded by the SPs, with implicit elimination of interference.

In one or more embodiments, the InP uses coordinated precoding to mitigate inter-cell interference.

In one or more embodiments, imperfect CSI is considered as having two-fold impact, on both the InP and the SPs, since both of them rely on the channel state to design the actual and virtual precoding matrices.

In one or more embodiments, the spatial isolation is used, where virtualization is achieved by MIMO precoding design. This approach may substantially outperform the strict physical isolation approach in the single-cell system.

In one or more embodiments, the online coordinated precoding for multi-cell MIMO WNV leads to a fully distributed implementation at each cell without any CSI exchange or central power control. Furthermore, the precoding solution at each cell is in a semi-closed form based only on the current imperfect CSI.

In particular, one or more embodiments extend a previous work with a new design of online coordinated precoding for MIMO WNV in a multi-cell system. The online algorithm is based on the previous work, but the multi-cell MIMO WNV problem is challenging with several key differences:
1) there is a virtualization demand and response mechanism between the InP and the SPs;
2) the SPs are oblivious to each other and share all antennas and wireless spectrum resources provided by the InP in each cell;
3) both the InP and the SPs design the actual and virtual precoding matrices based on imperfect CSI; and
4) multiple cells are coordinated at the precoding level and subject to transmit power constraints at each cell. These unique features of multi-cell MIMO WNV bring new challenges to the algorithm design and the performance analysis that is not addressed in the previous work. In particular, imperfect CSI has a two-fold impact on both the InP and the SPs and may require new techniques to bound the virtualization performance in terms of the difference between the SPs' virtualization demand and the InP's actual precoding outcome.

One or more embodiments relates to a multi-cell coordinated precoding for online MIMO WNV while analyzing the impact of imperfect CSI on both the InP and SPs.

An online downlink multi-cell MIMO WNV is formulated as a coordinated precoding problem to share all antennas and wireless spectrum resources among the SPs in each cell for efficient resource allocation, accommodating both long-term and short-term transmit power constraints at each cell. In each time slot, each SP is allowed to locally demand its precoder based on the imperfect CSI in each cell, without the need to be aware of both the wireless devices of other SPs in this cell and all the wireless devices in other cells. The InP coordinates the cells and designs the global precoder based on the imperfect CSI to minimize the deviation between the SPs' demands and the actual received signals at their wireless devices/users. This implies the implicit elimination of both the inter-SP and inter-cell interference.

An online multi-cell MIMO WNV algorithm is provided in one or more embodiments by extending the standard Lyapunov optimization to deal with imperfect CSI. The provided algorithm naturally leads to a fully distributed implementation at each cell, without any CSI exchange across the cells or central transmit power control. Furthermore, the online coordinated precoding solution is in a semi-closed form based only on the current imperfect CSI.

The analysis described herein illustrates that the performance of the algorithm, according to one or more embodiments, achieved with the up-to-date but imperfect CSI which can be arbitrarily close to an $\mathcal{O}(\delta)$ performance gap to the optimum achieved with perfect CSI over any given time horizon, where $\delta$ is a normalized measure of CSI inaccuracy. This two-fold impact of imperfect CSI on both the InP and the SPs is not considered in existing systems of multi-cell MIMO WNV.

Some additional information on the performance evaluation that was performed is as follows. Extensive simulation studies were conducted to validate the performance of the online coordinated precoding scheme for multi-cell MIMO WNV, under typical urban micro-cell Long-Term Evolution (LTE) network settings. The algorithm converges fast and is robust to imperfect CSI. It is further demonstrated that the performance advantage of the virtualized network enabled by the algorithm over a frequency division based virtualized system.

According to another aspect of the present disclosure, an infrastructure network node for providing a virtual multiple-input multiple-output, MIMO, cellular network supporting a plurality of network nodes associated with a plurality of service providers, SPs, is provided. The infrastructure network node comprises processing circuitry configured to determine a downlink coordinated precoder for online multi-cell MIMO wireless network virtualization, WNV, where the downlink coordinated precoder is based at least on imperfect channel state information, CSI. The processing circuitry is further configured to optionally indicate the downlink coordinated precoder.

According to one or more embodiments of this aspect, the downlink coordinating precoder is a global precoding matrix associated with the plurality of network nodes, and the downlink coordinating precoder is configured to reduce an average deviation between the downlink coordinating precoder and at least one virtual local precoder associated with at least one network node. According to one or more embodiments of this aspect, each of the plurality of network nodes is associated with a respective SP and respective virtualization demand. According to one or more embodiments of this aspect, the downlink coordinated precoding is configured to mitigate inter-SP interference. According to one or more embodiments of this aspect, the network node further comprises a plurality of antennas, where each of the plurality of network nodes is configured to share the plurality of antennas and wireless spectrum resources with at least one other network node of the plurality of network nodes. According to one or more embodiments of this aspect, the downlink coordinated precoder is determined based on a power constraint associated with at least one cell of the online multi-cell MIMO WNV. According to one or more embodiments of this aspect, the processing circuitry is further configured to store a virtual queue, and, at a second time slot subsequent to a first time slot, update the virtual queue based on, imperfect CSI associated with the first time slot, a state of the virtual queue during the first time slot, and a downlink coordinated precoder associated with the first time slot. The processing circuitry is further configured to determine a downlink coordinated precoder associated with the second time slot based on the updated virtual queue and imperfect CSI associated with the second time slot. According to one or more embodiments of this aspect, the processing circuitry is further configured to initialize the virtual queue to zero prior to the first time slot.

According to another aspect of the present disclosure, a method implemented in an infrastructure network node, the infrastructure node providing a virtual multiple-input multiple-output, MIMO, cellular network supporting a plurality of network nodes associated with a plurality of service provides, SPs, is provided. A downlink coordinated precoder for online multi-cell MIMO wireless network virtualization, WNV, is determined, where the downlink coordinated precoder is based at least on imperfect channel state information, CSI. Optionally, the downlink coordinated precoder is indicated.

According to one or more embodiments of this aspect, the downlink coordinating precoder is a global precoding matrix associated with the plurality of network nodes, where the downlink coordinating precoder is configured to reduce an average deviation between the downlink coordinating precoder and at least one virtual local precoder associated with at least one network node. According to one or more embodiments of this aspect, wherein each of the plurality of network nodes is associated with a respective SP and respective virtualization demand. According to one or more embodiments of this aspect, the downlink coordinated precoding is configured to mitigate inter-SP interference. According to one or more embodiments of this aspect, each of the plurality of network nodes is configured to share a plurality of antennas and wireless spectrum resources with at least one other network node of the plurality of network nodes. According to one or more embodiments of this aspect, the downlink coordinated precoder is determined based on a power constraint associated with at least one cell of the online multi-cell MIMO WNV. According to one or more embodiments of this aspect, a virtual queue is stored, and, at a second time slot subsequent to a first time slot, the virtual queue is updated based on imperfect CSI associated with the first time slot, a state of the virtual queue during the first time slot, and a downlink coordinated precoder associated with the first time slot. A downlink coordinated precoder associated with the second time slot is determined based on the updated virtual queue and imperfect CSI associated with the second time slot. According to one or more embodiments of this aspect, the virtual queue is initialized to zero prior to the first time slot.

According to another aspect of the present disclosure, a first network node configured to communicate with an infrastructure network node that is configured to provide a virtual multiple-input multiple-output. MIMO, cellular network supporting a plurality of network nodes associated with a plurality of service providers, SPs, the plurality of network nodes including the first network node, is provided. The first network node comprises processing circuitry configured to determine a virtual local precoder for downlink communication based at least on a local virtualization demand. The processing circuitry is further configured to receive an indication of a downlink coordinated precoder for online multi-cell MIMO wireless network virtualization, WNV, where the downlink coordinated precoder is based at least on imperfect channel state information, CSI and the virtual local precoder.

According to one or more embodiments of this aspect, the downlink coordinating precoder is a global precoding matrix associated with the plurality of network nodes, where the downlink coordinating precoder is configured to reduce an average deviation between the downlink coordinating precoder and the virtual local precoder associated with the first network node. According to one or more embodiments of this aspect, each of the plurality of network nodes is associated with a respective SP and respective virtualization demand. According to one or more embodiments of this aspect, the downlink coordinated precoding is configured to mitigate inter-SP interference. According to one or more embodiments of this aspect, the first network node is configured to share a plurality of antennas and wireless spectrum resources with at least one other network node of the plurality of network nodes. According to one or more embodiments of this aspect, the downlink coordinated precoder is based on a power constraint associated with at least one cell of the online multi-cell MIMO WNV.

According to another aspect of the present disclosure, a method implemented in a first network node that is configured to communicate with an infrastructure network node that is configured to provide a virtual multiple-input multiple-output, MIMO, cellular network supporting a plurality of network nodes associated with a plurality of service provides, SPs, is provided. A virtual local precoder for downlink communication is determined based at least on a local virtualization demand. An indication of a downlink coordinated precoder for online multi-cell MIMO wireless network virtualization, WNV, is received, where the downlink coordinated precoder is based at least on imperfect channel state information, CSI, and the virtual local precoder.

According to one or more embodiments of this aspect, the downlink coordinating precoder is a global precoding matrix associated with the plurality of network nodes, where the downlink coordinating precoder is configured to reduce an average deviation between the downlink coordinating precoder and the virtual local precoder associated with the first network node. According to one or more embodiments of this aspect, each of the plurality of network nodes is associated with a respective SP and respective virtualization demand. According to one or more embodiments of this aspect, the downlink coordinated precoding is configured to mitigate inter-SP interference. According to one or more embodiments of this aspect, in the first network node is configured to share a plurality of antennas and wireless spectrum resources with at least one other network node of the plurality of network nodes. According to one or more embodiments of this aspect, the downlink coordinated precoder is based on a power constraint associated with at least one cell of the online multi-cell MIMO WNV.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
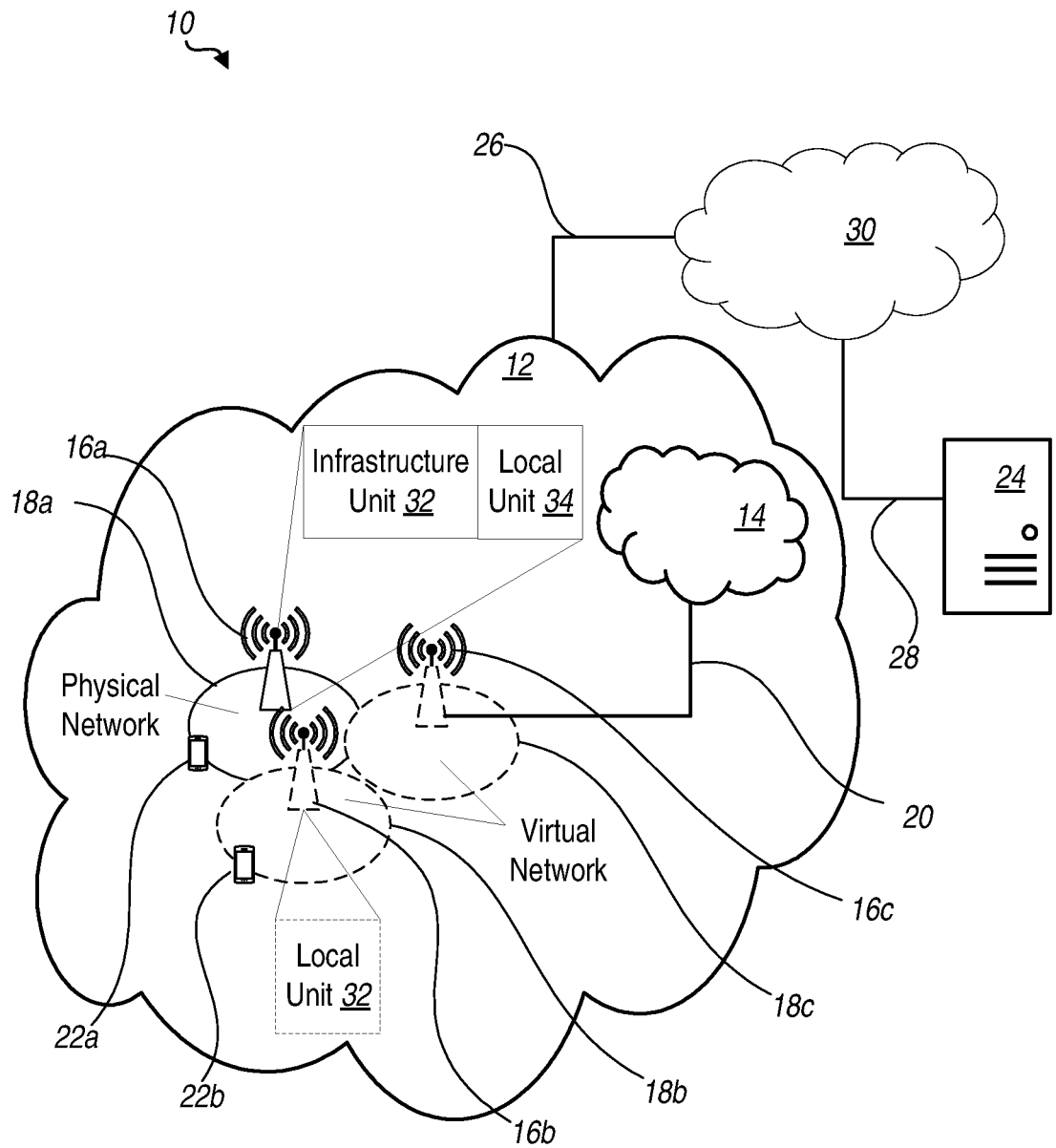
FIG. 1 is a schematic diagram of an example network architecture illustrating a communication system connected via an intermediate network to a host computer according to the principles in the present disclosure.

Before describing in detail example embodiments, it is noted that the embodiments reside primarily in combinations of apparatus components and processing steps related to a coordinated precoder for online multi-cell MIMO WNV. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node. The network node may be a virtual network node, as described herein. For example, a virtual network node may be one or more network nodes which share hardware and/or radio spectrum and/or transmit power.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IOT) device, or a Narrowband IoT (NB-IOT) device, etc.

Also, in some embodiments, the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

In some embodiments, the general description elements in the form of "one of A and B" corresponds to A or B. In some embodiments, at least one of A and B corresponds to A, B or AB, or to one or more of A and B. In some embodiments, at least one of A, B and C corresponds to one or more of A, B and C, and/or A, B, C or a combination thereof.

Transmitting in downlink may pertain to transmission from the network or network node to the wireless device. Transmitting in uplink may pertain to transmission from the wireless device to the network or network node. Transmitting in sidelink may pertain to (direct) transmission from one wireless device to another. Uplink, downlink and sidelink (e.g., sidelink transmission and reception) may be considered communication directions. In some variants, uplink and downlink may also be used to described wireless communication between network nodes, e.g., for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

The term "imperfect CSI" as used herein may refer to incomplete CSI, CSI which contains one or more errors, CSI pertaining to a subset of channels associated with one or more network nodes and/or with one or more cells, CSI which lacks information pertaining to a subset of channels associated with one or more network nodes and/or with one or more cells, CSI pertaining to a subset of a plurality of network nodes associated with one or more cells, and/or CSI which lacks information pertaining to a subset of a plurality of network nodes associated with one or more cells. For example, "imperfect CSI" may refer to CSI associated with a first SP in a cell which lacks channel information associated with wireless devices of other SPs in the cell.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide a coordinated precoder for online multi-cell MIMO WNV. Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. In one or more embodiments, one network node 16 is an infrastructure network node 16 that is configured to provide one or more virtual network nodes 16 as illustrated in FIG. 1 where network node 16a is an infrastructure network node 16a. The number of infrastructure network node(s) 16 and virtual network nodes 16 may be varied in accordance with the teachings of the instant disclosure.

A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include an infrastructure unit 32 which is configured to perform one or more network node 16 functions (i.e., infrastructure network node 16 functions) as described herein such as with respect to a coordinated precoder for online multi-cell MIMO WNV. A network node 16 is configured to include a local unit 32 which is configured to perform one or more network node 16 functions (i.e., virtual network node 16 functions) as described herein such as with respect to a coordinated precoder for online multi-cell MIMO WNV.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to analyze, determine, communication, transmit, receive, forward, relay, store, etc., information associated with a coordinated precoder for online multi-cell MIMO WNV.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include an infrastructure unit 32 configured to perform one or more network node 16 functions (i.e., infrastructure network node 16 functions) as described herein such as with respect to a coordinated precoder for online multi-cell MIMO WNV. For example, processing circuitry 68 of the network node 16 may include a local unit 32 which is configured to perform one or more network node 16 functions (i.e., virtual network node 16 functions) as described herein such as with respect to a coordinated precoder for online multi-cell MIMO WNV.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

Figure 2:
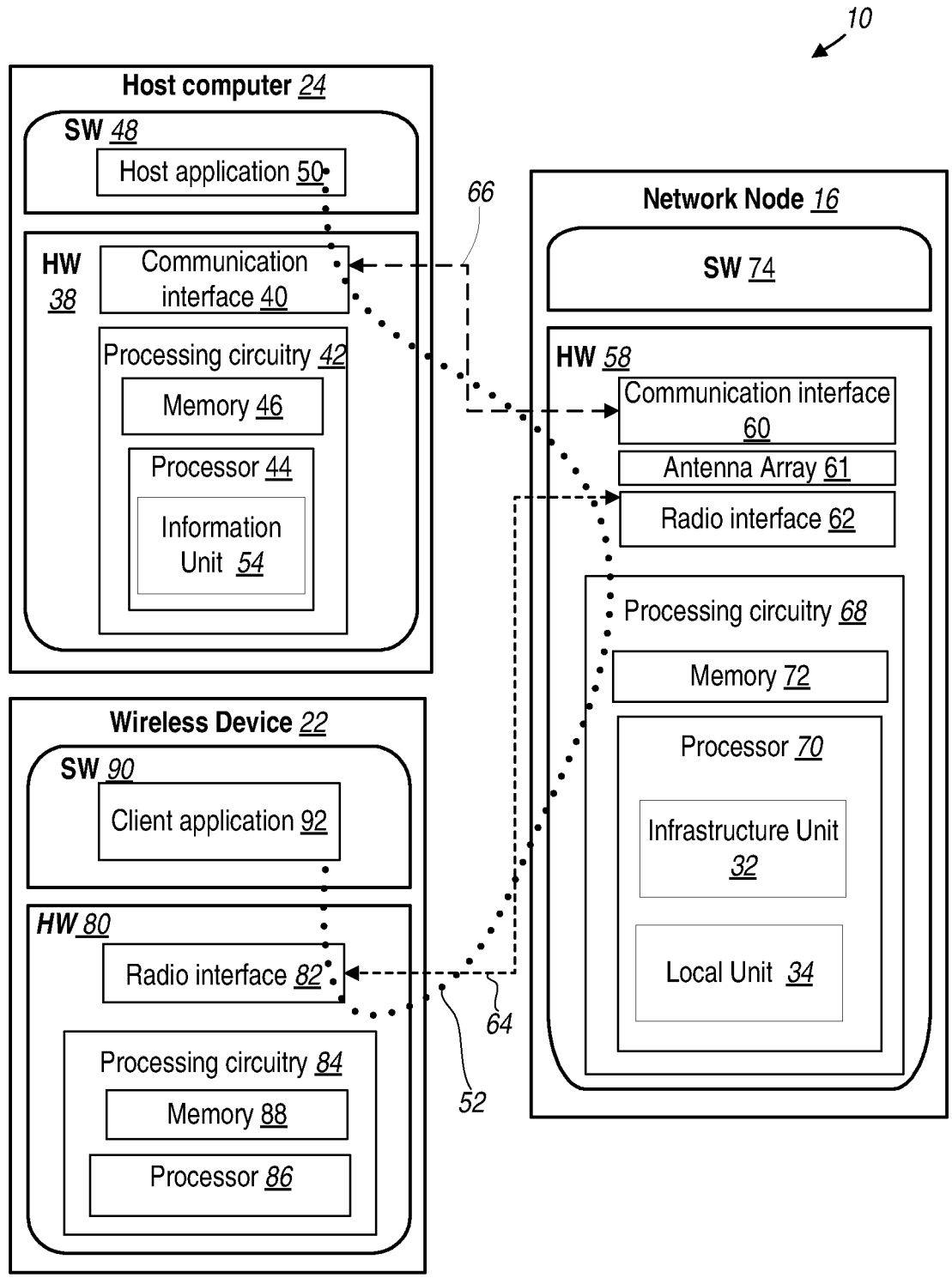
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as infrastructure unit 32, and local unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 3, 4:
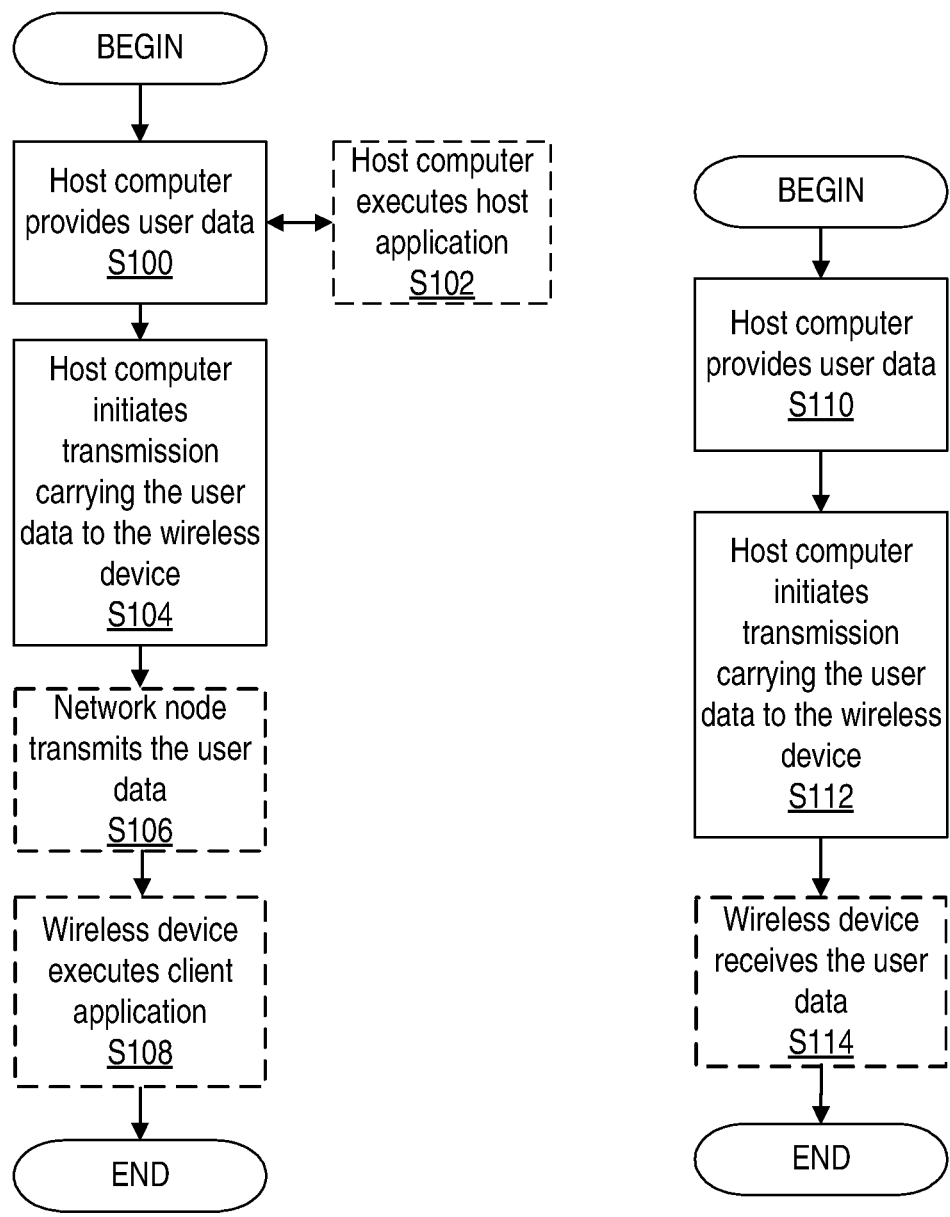
FIG. 3 is a flowchart illustrating example methods implemented in a communication system including a host computer, a network node and a wireless device for executing a client application at a wireless device according to some embodiments of the present disclosure.
FIG. 4 is a flowchart illustrating example methods implemented in a communication system including a host computer, a network node and a wireless device for receiving user data at a wireless device according to some embodiments of the present disclosure.

FIG. 3 is a flowchart illustrating an example method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 4 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 5, 6:
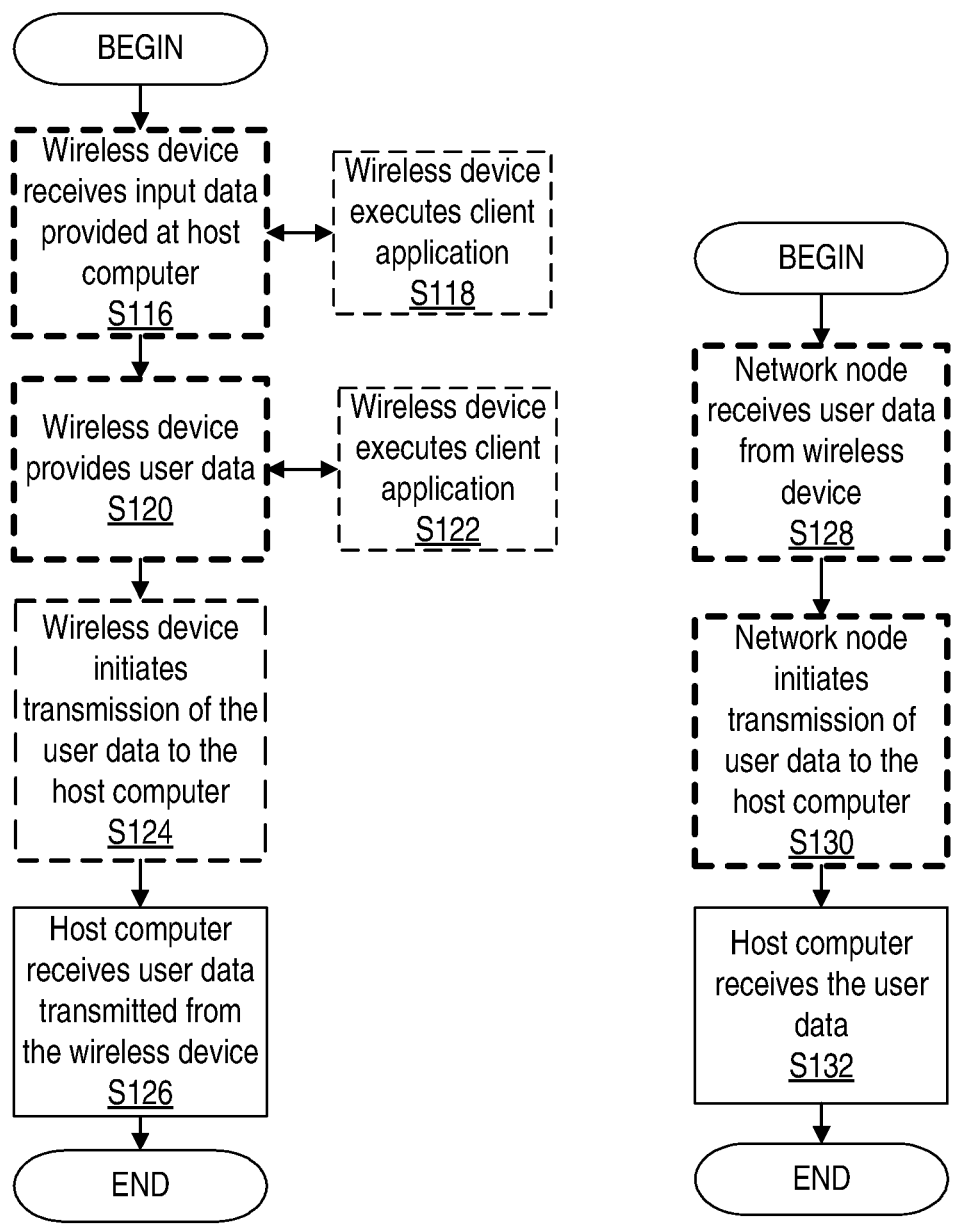
FIG. 5 is a flowchart illustrating example methods implemented in a communication system including a host computer, a network node and a wireless device for receiving user data from the wireless device at a host computer according to some embodiments of the present disclosure.
FIG. 6 is a flowchart illustrating example methods implemented in a communication system including a host computer, a network node and a wireless device for receiving user data at a host computer according to some embodiments of the present disclosure.

FIG. 5 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 6 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
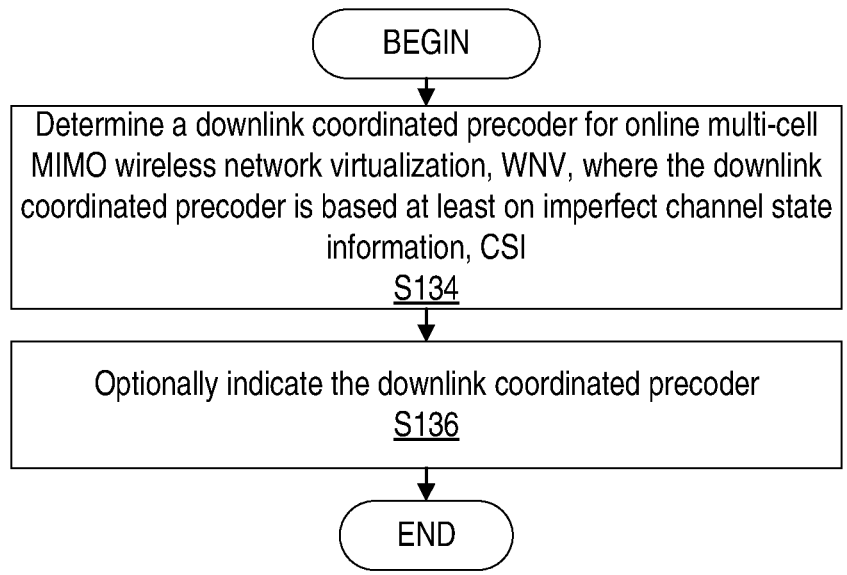
FIG. 7 is a flowchart of an example process in a network node according to some embodiments of the present disclosure.

FIG. 7 is a flowchart of an example process in a network node 16 according to some embodiments of the present disclosure. One or more blocks described herein may be performed by one or more elements of network node 16 such as by one or more of processing circuitry 68 (including the infrastructure unit 32), processor 70, radio interface 62 and/or communication interface 60. In one or more embodiments, the network node 16 (infrastructure network node 16) provides a virtual multiple-input multiple-output, MIMO, cellular network supporting a plurality of network nodes (i.e., virtual network nodes) associated with a plurality of service providers, SPs. Network node 16 (i.e., infrastructure network node 16) is configured to determine (Block S134) a downlink coordinated precoder for online multi-cell MIMO wireless network virtualization, WNV, the downlink coordinated precoder being based at least on imperfect channel state information, CSI, as described herein. Network node 16 (i.e., infrastructure network node 16) is configured to optionally indicate (Block S136) the downlink coordinated precoder for implementation, as described herein.

According to one or more embodiments, the downlink coordinating precoder is a global precoder matrix associated with the plurality of network nodes 16 where the downlink coordinating precoder is configured to reduce an average deviation between the downlink coordinating precoder and at least one virtual local precoder associated with at least one network node 16. According to one or more embodiments, the plurality of network nodes 16 are independent of each other, each network node 16 being associated with a respective SP and respective virtualization demand. According to one or more embodiments, the downlink coordinated precoder is configured to mitigate inter-SP interference. According to one or more embodiments, the network node 16 further includes a plurality of antennas where the plurality of network nodes 16 are configured to share antennas and wireless spectrum resources.

According to one or more embodiments, the downlink coordinating precoder is a global precoding matrix associated with the plurality of network nodes 16, the downlink coordinating precoder being configured to reduce an average deviation between the downlink coordinating precoder and at least one virtual local precoder associated with at least one network node 16.

According to one or more embodiments, each of the plurality of network nodes 16 is associated with a respective SP and respective virtualization demand.

According to one or more embodiments, the downlink coordinated precoding is configured to mitigate inter-SP interference.

According to one or more embodiments, the infrastructure network node 16 further comprises a plurality of antennas, each of the plurality of network nodes 16 being configured to share the plurality of antennas 61 and wireless spectrum resources with at least one other network node 16 of the plurality of network nodes 16.

According to one or more embodiments, the downlink coordinated precoder is determined based on a power constraint associated with at least one cell 18 of the online multi-cell MIMO WNV.

According to one or more embodiments, the processing circuitry 68 is further configured to: store a virtual queue; and at a second time slot subsequent to a first time slot: update the virtual queue based on: imperfect CSI associated with the first time slot, a state of the virtual queue during the first time slot, and a downlink coordinated precoder associated with the first time slot; and determine a downlink coordinated precoder associated with the second time slot based on the updated virtual queue and imperfect CSI associated with the second time slot.

According to one or more embodiments, the processing circuitry 68 is further configured to initialize the virtual queue to zero prior to the first time slot.

Figure 8:
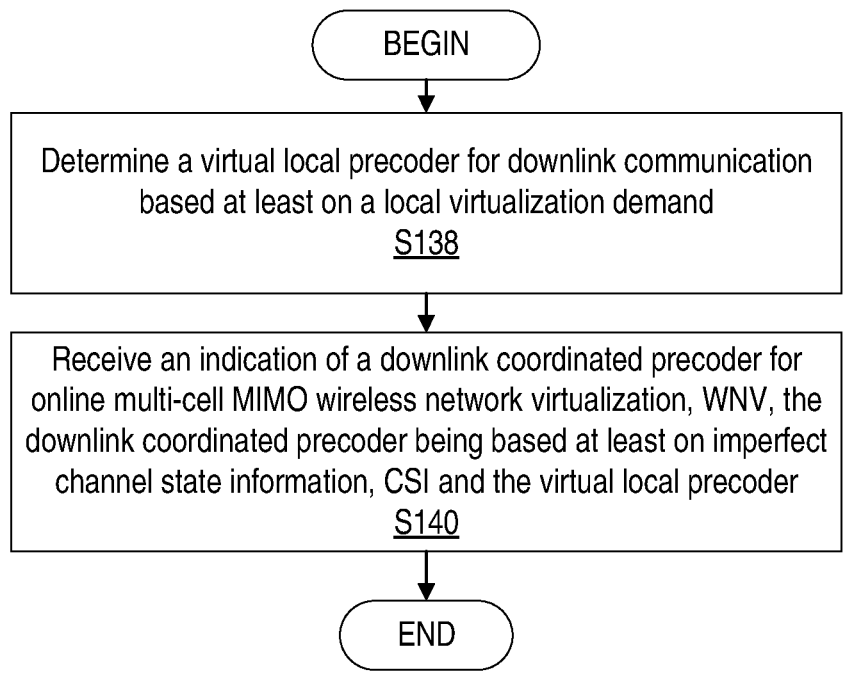
FIG. 8 is a flowchart of another example process in a network node according to some embodiments of the present disclosure.

FIG. 8 is a flowchart of another example process in a network node 16 (i.e., virtual network node) according to some embodiments of the present disclosure. One or more blocks described herein may be performed by one or more elements of network node 16 such as by one or more of processing circuitry 68 (including the infrastructure unit 32), processor 70, radio interface 62 and/or communication interface 60. In one or more embodiments, a network node 16 (i.e., a first network node 16 such as a first virtual network node 16) configured to communicate with an infrastructure network node 16 that is configured to provide a virtual multiple-input multiple-output, MIMO, cellular network supporting a plurality of network nodes 16 associated with a plurality of service providers, SPs where the plurality of network nodes 16 including the first network node 16. The network node 16 is configured to determine (Block S138) a virtual local precoder for downlink communication based at least on a local virtualization demand, as described herein. The network node 16 is configured to receive (Block S140) an indication of a downlink coordinated precoder for online multi-cell MIMO wireless network virtualization, WNV, where the downlink coordinated precoder is based at least on imperfect channels state information, CSI, and the virtual local precoder, as described herein.

According to one or more embodiments, the downlink coordinating precoder is a global precoder matrix associated with the plurality of network nodes 16 where the downlink coordinating precoder is configured to reduce an average deviation between the downlink coordinating precoder and the virtual local precoder associated with (or determined by) network node 16 (i.e., first network node 16).

According to one or more embodiments, the network node 16 (i.e., first network node 16) is independent of the plurality of network nodes 16 where each network node 16 is associated with a respective SP and respective virtualization demand. According to one or more embodiments, the downlink coordinated precoder is configured to mitigate inter-SP interference. According to one or more embodiments, network node 16 (i.e., first network node 16) is configured to share a plurality of antennas and wireless spectrum resources with the plurality of network nodes 16.

According to one or more embodiments, the downlink coordinating precoder is a global precoding matrix associated with the plurality of network nodes 16, the downlink coordinating precoder being configured to reduce an average deviation between the downlink coordinating precoder and the virtual local precoder associated with the first network node 16.

According to one or more embodiments, each of the plurality of network nodes 16 is associated with a respective SP and respective virtualization demand.

According to one or more embodiments, the downlink coordinated precoding is configured to mitigate inter-SP interference.

According to one or more embodiments, the first network node 16 is configured to share a plurality of antennas and wireless spectrum resources with at least one other network node 16 of the plurality of network nodes 16.

According to one or more embodiments, the downlink coordinated precoder is based on a power constraint associated with at least one cell 18 of the online multi-cell MIMO WNV.

Having generally described arrangements for determining and/or implementing a coordinated precoder for online multi-cell MIMO WNV, details for these arrangements, functions and processes are provided as follows, and which may be implemented by the network node 16, wireless device 22 and/or host computer 24.

Some embodiments provide a coordinated precoder for online multi-cell MIMO WNV. One or more InP functions discussed below may be implemented by network node 16 (i.e., infrastructure network node 16) such as via one or more of processing circuitry 68, processor 70, infrastructure unit 32, radio interface 62, communication interface 60, etc. One or more SP functions described below may be implemented by network node 16 (i.e., virtual network node 16) such as via one or more of processing circuitry 68, processor 70, local unit 32, radio interface 62, communication interface 60, etc. In one or more embodiments, each SP may be associated with a respective network node 16 (i.e., respective virtual network node 16).

An online single-cell MIMO WNV method is generalized to the multi-cell system. Considerations for algorithm design in a multi-cell system are the level of coordination and the issue of distributed implementation. In this section, the idea of single-cell spatial virtualization is first extended to the multi-cell system through coordinated precoding design at the InP. It is illustrated that the coordinated precoding scheme described herein leads to a fully distributed per-cell implementation, without any CSI exchange across the cells or centralized transmit power control.

Multi-Cell Spatial Virtualization
System Model

A virtualized MIMO cellular network is considered where one InP performs virtualization to C cells and serves M SPs. Let $\mathcal{C}=\{1,\ldots,C\}$ and $\mathcal{M}=\{1,\ldots,M\}$. The InP owns and coordinates network nodes 16 for data transmission. The SPs are oblivious to each other and serve their subscribing wireless devices 22/users. Other functional structures of the network, including the core network 14 and computational resources, are assumed to be already virtualized.

In each cell $c \in \mathcal{C}$, the SPs share the $N_c$ antennas at network node 16. There is a total of $N=\Sigma_{c\in\mathcal{C}} N_c$ antennas in the network. Each SP $m \in \mathcal{M}$ has $K_c^m$ wireless devices 22 in cell c. Let $\mathcal{K}_c^m=\{1,\ldots,K_c^m\}$. There is a total of $K_c=\Sigma_{m\in\mathcal{M}} K_c^m$ wireless devices 22 in cell c, and $K=\Sigma_{c\in\mathcal{C}} K_c$ wireless devices 22 in the network. Let $\mathcal{K}_c=\{1,\ldots,K_c\}$ and $\mathcal{K}=\{1,\ldots,K\}$. Define $H(t) \in \mathbb{C}^{K \times N}$ as the global channel state, and $H_{cl}^m(t) \in \mathbb{C}^{K_c^m \times N_l}$ as the channel state between the $K_c^m$ wireless devices 22 of SP m in cell c and network node 16 in cell l at time t. It may be assumed that MIMO block fading channel model, where H(t) remains constant in each block and changes from block to block independently. Thus, H(t) over time slots are independent and identically distributed (i.i.d.).

Figure 9:
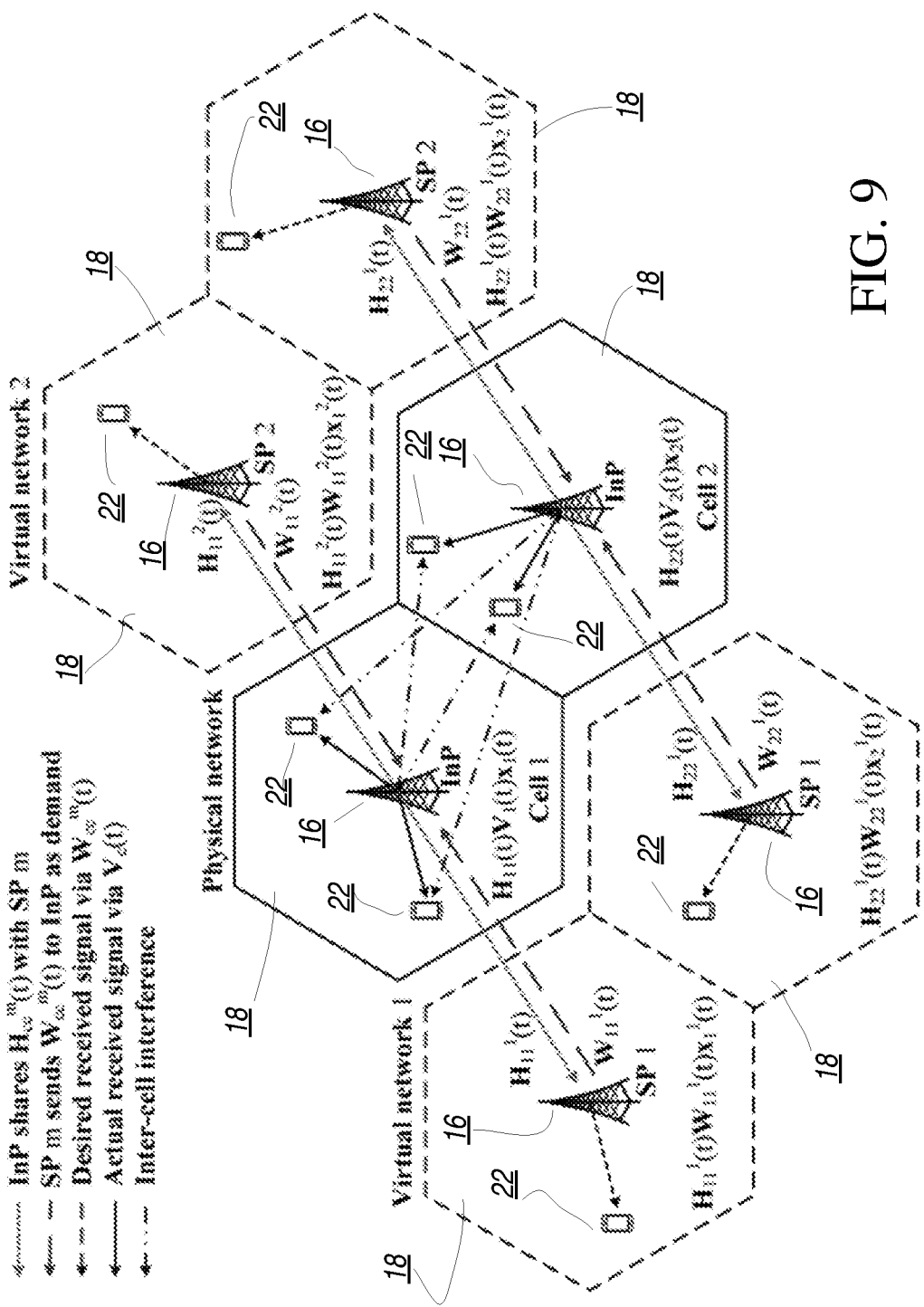
FIG. 9 is a diagram of a WNV in a MIMO network with two cells, one InP and two SPs each serving its wireless devices in a virtual network according to some embodiments of the present disclosure.

For ease of exposition, an example of multi-cell spatial virtualization with perfect CSI is illustrated in FIG. 9. At each time t, in each cell c, the InP shares the corresponding channel state $H_{cc}{}^m(t)$ with SP m and allocates a transmission power $P_c{}^m$ to the SP. Using $H_{cc}{}^m(t)$, each SP m designs its precoding matrix $W_{cc}{}^m(t) \in \mathbb{C}^{N_i \times K_c{}^m}$, subject to the transmit power limit $\|W_{cc}{}^m(t)\|_F^2 \leq P_c{}^m$. Each SP m then sends $W_{cc}{}^m(t)$ to the InP as a virtual precoding matrix by the SP. For SP m, with $W_{cc}{}^m(t)$, the virtual received signal vector $\tilde{y}_c{}^m(t)$ (at its $K_c{}^m$ users in cell c) is given by $\tilde{y}_c{}^m(t) = \tilde{r}_c{}^m(t) + n_c{}^m(t)$, where $n_c{}^m(t)$ is the received additive noise vector, and $$\tilde{r}_c^m(t) = H_{cc}^m(t) W_{cc}^m(t) x_c^m(t)$$

is the desired received signal vector (noiseless), with $x_c{}^m(t)$ being the transmitted signal vector. Define $\tilde{y}_c(t) \triangleq [\tilde{y}_c{}^{1H}(t), \ldots, \tilde{y}_c{}^{MH}(t)]^H$ as the virtual received signal vector at all $K_c$ wireless devices 22 in cell c, which leads to $\tilde{y}_c(t) = \tilde{r}_c(t) + n_c(t)$, where $$\tilde{r}_c(t) = D_c(t) x_c(t)$$

is the desired received signal vector, with $D_c(t) \triangleq \text{blk diag}\{H_{cc}{}^1(t) W_{cc}{}^1(t), \ldots, H_{cc}{}^M(t) W_{cc}{}^M(t)\} \in \mathbb{C}^{K_c \times K_c}$ being the virtualization demand made by all SPs in cell c, $x_c(t) \triangleq [x_c{}^{1H}(t), \ldots, x_c{}^{MH}(t)]^H$ and $n_c(t) \triangleq [n_c{}^{1H}(t), \ldots, n_c{}^{MH}(t)]^H$. Define $\tilde{y}(t) \triangleq [\tilde{y}_1{}^H(t), \ldots, \tilde{y}_C{}^H(t)]^H$ as the virtual received signal vector at all K wireless devices 22 in the network, $\tilde{y}(t) = \tilde{r}(t) + n(t)$, where $$\tilde{r}(t) = D(t) x(t)$$

with $D(t) \triangleq \text{blk diag}\{D_1(t), \ldots, D_c(t)\} \in \mathbb{C}^{K \times K}$ being the virtualization demand of the network, $x(t) \triangleq [x_1{}^H(t), \ldots, x_C{}^H(t)]^H$, and $n(t) \triangleq [n_1{}^H(t), \ldots, n_C{}^H(t)]^H$.

At each time t, the InP coordinates the C cells at the precoding level to serve all K wireless devices 22 in the network. Define $H_{cl}(t) \triangleq [H_{cl}{}^{1H}(t), \ldots, H_{cl}{}^M(t)(t)]^H \in \mathbb{C}^{K_c \times N_l}$ as the channel state between wireless devices 22 in cell c and network node 16 in cell l. In each cell c, with local channel state $H_c(t) \triangleq [H_{1c}{}^H(t), \ldots, H_{Cc}{}^H(t)]^H \in \mathbb{C}^{K \times N_c}$, the InP designs the actual downlink precoding matrix $V_c(t) \triangleq [V_c{}^1(t), \ldots, V_c{}^M(t)]^H \in \mathbb{C}^{N_c \times K_c}$ to serve the $K_c$ wireless devices 22, where $V_c{}^m(t) \in \mathbb{C}^{N_c \times K_c{}^m}$ is the actual downlink precoding matrix for SP m. The actual received signal vector $y_c{}^m(t)$ at the $K_c{}^m$ users of SP m in cell c is given by $y_c{}^m(t) = r_c{}^m(t) + n_c{}^m(t)$, where $r_c{}^m(t)$ is the actual received signal vector (noiseless), given by $$r_c^m(t) =$$

$$H_{cc}^m(t) V_c^m(t) x_c^m(t) + \sum_{i \in M, i \neq m} H_{cc}^m(t) V_c^i(t) x_c^i(t) + \sum_{l \in \mathcal{C}, l \neq c} \sum_{j \in M} H_{cl}^m(t) V_l^j(t) x_l^j(t)$$

The second and third terms in the above equation are the inter-SP interference from the other SPs in cell c and the inter-cell interference from the other cells, respectively. The actual received signal vector $y_c(t) \triangleq [y_c{}^{1H}(t), \ldots, y_c{}^{MH}(t)]^H$ at all $K_c$ wireless devices 22 in cell c is given by $y_c(t) = r_c(t) + n_c(t)$, where $$r_c(t) = H_{cc}(t) V_c(t) x_c(t) + \sum_{l \in \mathcal{C}, l \neq c} H_{cl}(t) V_l(t) x_l(t).$$

The actual received signal vector $y(t) \triangleq [y_1{}^H(t), \ldots, y_C{}^H(t)]^H$ at all K wireless devices 22 in the network is $y(t) = r(t) + n(t)$, where $$r(t) = H(t) V(t) x(t)$$

with $V(t) \triangleq \text{blk diag}\{V_1(t), \ldots, V_C(t)\}$ being the actual global precoding matrix designed by the InP.

Problem Formulation

For downlink multi-cell MIMO WNV, the InP designs the actual global precoding matrix V(t) to perform virtualization. Note that each SP m in each cell c locally designs/determines its virtual precoding matrix $W_{cc}{}^m(t)$ without considering both the inter-SP and inter-cell interference. In one or more embodiments, the virtual precoding matrix $W_{cc}{}^m(t)$ may be reported to the InP (i.e., infrastructure network node 16) for use by the InP such as, for example, determining the downlink global precoding matrix. The InP designs the actual global downlink precoding matrix V(t) to mitigate both the inter-SP and inter-cell interference, to meet the virtualization demand D(t) received from the SPs. In one or more embodiments, the InP may signal/indicate the global downlink precoding matrix V(t) to one or more SPs for implementation.

With the InP's actual global precoding matrix V(t) and each SP m's virtual local precoding matrix $W_{cc}{}^m(t)$, the expected deviation of the actual received signal vector at all K wireless devices 22 from the desired one is given by $$\mathbb{E}\{\|r - \tilde{r}\|_F^2\} = \mathbb{E}\{\|H(t)V(t) - D(t)\|_F^2\} = \mathbb{E}\left\{\sum_{c \in \mathcal{C}} \|H_c(t)V_c(t) - D'_c(t)\|_F^2\right\}. \quad (1)$$

where $D'_c(t) \triangleq [0, \ldots, D_c{}^H(t), \ldots, 0]^H \in \mathbb{C}^{K \times K_c}$.

One goal at the InP is to optimize coordinated MIMO precoding to minimize the long-term time-averaged expected precoding deviation from the virtualization demand, subject to both long-term and short-term transmit power constraints at each cell. The optimization problem is formulated as follows:

$$P1: \min_{\{V(t)\}} \lim_{T \to \infty} \frac{1}{T} \sum_{t=0}^{T-1} E\{\|H(t)V(t) - D(t)\|_F^2\} \quad (2)$$

$$\text{s.t.} \lim_{T \to \infty} \frac{1}{T} \sum_{t=0}^{T-1} E\{\|V_c(t)\|_F^2\} \leq \bar{P}_c, \forall c \in \mathcal{C}$$

$$\|V_c(t)\|_F^2 \leq P_c^{max}, \forall c \in \mathcal{C} \quad (3)$$

where $\bar{P}_c$ is the average transmit power limit, and $P_c{}^{max}$ is the maximum transmit power limit at network node 16 in cell c. It may be assumed that $\bar{P}_c \leq P_c{}^{max}, \forall c \in \mathcal{C}$.

Since channel state H(t) is random, P1 is a stochastic optimization problem. It is challenging to solve, especially when the distribution of H(t) is unknown due to the difficulty of measuring it in MIMO systems with a large number of antennas and wireless devices 22. If the channel distribution is known, it is possible to solve P1 through Dynamic Programming (DP). However, the DP method disadvantageously has higher dimensionality in computational complexity and is impractical for real systems especially for large N and K. Besides, the accurate channel state may not be obtained accurately in practical systems. Typically, the InP only has an inaccurate estimate of the channel state $\hat{H}(t)$ at each time t.

With an inaccurate estimation of the global channel state $\hat{H}(t)$ at each time t, each SP m only has the imperfect channel state $\hat{H}_{cc}^m(t)$ shared by the InP to design its virtual precoding matrix denoted by $\hat{W}_{cc}^m(t)$. As a result, the InP receives an inaccurate virtualization demand from the network, defined as $\hat{D}(t) \triangleq \text{blk diag}\{\hat{D}_1(t), \ldots, \hat{D}_C(t)\}$, where $\hat{D}_c(t) \triangleq \text{blk diag}\{H_{cc}^1(t)\hat{W}_{cc}^1(t), \ldots, \hat{H}_{cc}^M(t)\hat{W}_{cc}^M(t)\}$ is the inaccurate virtualization demand from cell c. Based on $\hat{H}(t)$ and $\hat{D}(t)$, the InP then designs the actual global precoding matrix, defined by $\hat{V}(t) \triangleq \text{blk diag}\{\hat{V}_1(t), \ldots, \hat{V}_C(t)\}$. One aspect of the disclosure is to develop an online multi-cell MIMO WNV algorithm based on $\hat{H}(t)$ and $\hat{D}(t)$ for a coordinated precoding solution $\{\hat{V}(t)\}$ to P1.

With the above problem formulation, in this disclosure, an online multi-cell MIMO WNV algorithm under unknown CDI and inaccurate CSI is described to find a coordinated precoding solution for P1. The general Lyapunov optimization approach is used for the online algorithm design. However, different from the standard drift-plus-penalty (DPP) technique for Lyapunov optimization based on the perfect system state, the disclosure provides new techniques to design an algorithm based on inaccurate system state information, which will be shown to provide deterministic performance bounds. This algorithm extends the online single-cell MIMO WNV algorithm to the coordinated multi-cell setting.

Online Multi-Cell MIMO WNV Algorithm

To design an online algorithm for solving P1, a virtual queue vector $Z(t) \triangleq [Z_1(t), \ldots, Z_C(t)]^T$ is introduced for the long-term average transmit power constraint (2) with the updating rule given by $$Z_c(t+1) = \max\{Z_c(t) + \|\hat{V}_c(t)\|_F^2 - \bar{P}_c, 0\}, \forall c \in \mathcal{C}. \quad (4)$$

Redefine $$L(t) \triangleq \frac{1}{2}\|Z(t)\|_2^2$$

as the quadratic Lyapunov function and $\Delta(t) \triangleq L(t+1) - L(t)$ as the corresponding Lyapunov drift at time t. Solving P1 can be converted to minimizing a DPP metric redefined as $\mathbb{E}\{\Delta(t)|Z(t)\} + U\mathbb{E}\{\hat{\rho}(t)|Z(t)\}$, where $\hat{\rho}(t) \triangleq \|\hat{H}(t)\hat{V}(t) - \hat{D}(t)\|_F^2$ and $U > 0$. An upper bound for the DPP metric is provided in the following lemma.

Lemma 1. At each time t, for any precoding design of $\hat{V}(t)$, the DPP metric has the following upper bound for all $Z(t)$ and $U>0$:

$$S + U\mathbb{E}\{\hat{\rho}(t)|Z(t)\} + \mathbb{E}\Big\{\sum_{c \in \mathcal{C}} Z_c(t)\big(\|\hat{V}_c(t)\|_F^2 - \bar{P}_c\big)|Z(t)\Big\} \quad (5)$$

where $$S \triangleq \frac{1}{2}\sum_{c \in \mathcal{C}} \max\{(P_c^{max} - \bar{P}_c)^2, \bar{P}_c^2\}.$$

Given $\hat{H}(t)$ at each time t, the conditional expectation and the constant terms of the upper bound in Lemma 1 as objective are removed. The resulting per-slot coordinated precoding design optimization problem is given as follows:

$$P2: \min_{\hat{V}(t)} U\|\hat{H}(t)\hat{V}(t) - \hat{D}(t)\|_F^2 + \sum_{c \in \mathcal{C}} Z_c(t)\|\hat{V}_c(t)\|_F^2$$

$$\text{s.t.} \|\hat{V}_c(t)\|_F^2 \leq P_c^{max}, \forall c \in \mathcal{C}.$$

From (1), P2 can be equivalently decomposed into C subproblems, each corresponds to a local precoding design optimization problem for cell c given by $$P3: \min_{\hat{V}_c(t)} U\|\hat{H}_c(t)\hat{V}_c(t) - \hat{D}'_c(t)\|_F^2 + Z_c(t)\|\hat{V}_c(t)\|_F^2 \quad (6)$$

$$\text{s.t.} \|\hat{V}_c(t)\|_F^2 \leq P_c^{max}.$$

Figure 10:
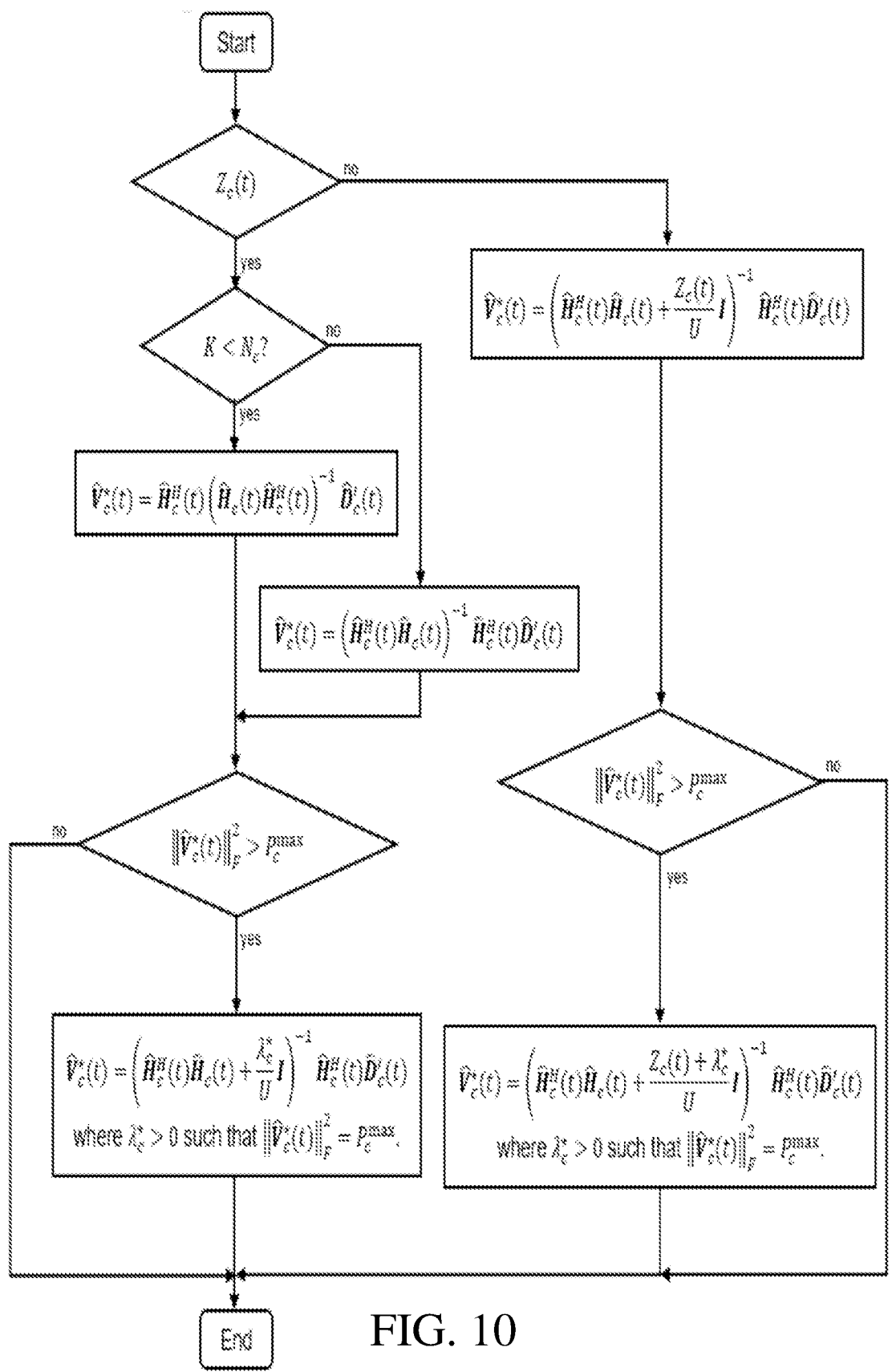
FIG. 10 is a flow diagram of Algorithm 1 related to an online precoding solution to P3 at time t according to some embodiments of the present disclosure.
Figure 11:
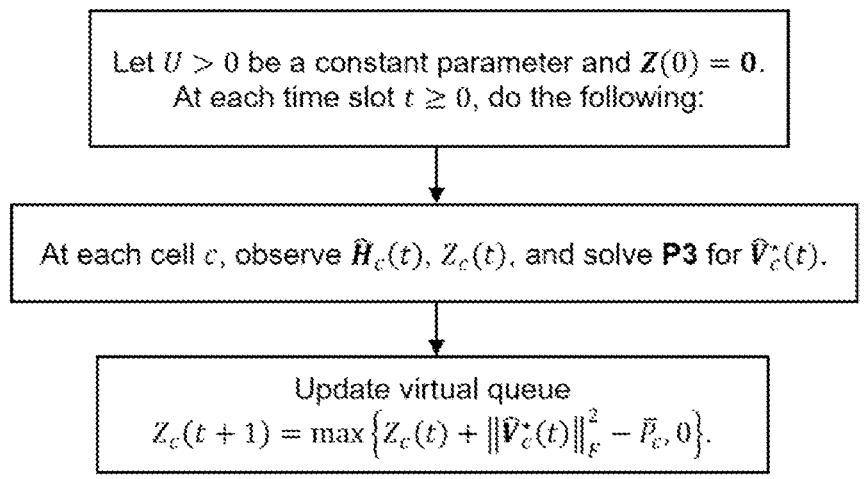
FIG. 11 is a flow diagram of Algorithm 2 related to an online coordinated multi-cell MIMO WNV algorithm according to some embodiments of the present disclosure.

Note that P3 is a constrained regularized least square problem has a semi-closed-form solution for each cell c in Algorithm 1 (illustrated in FIG. 10) with computational complexity in the order of $\mathcal{O}(N_c^3)$. At each time t, for each cell c, based only on the inaccurate local channel state $\hat{H}_c(t)$ and virtualization demand $\hat{D}_c(t)$, the InP solves P3 for an optimal local precoding matrix $\hat{V}_c^*(t)$, and then update the virtual queue $Z_c(t)$ according to its queue dynamics in (4). As such, the online coordinated multi-cell MIMO WNV problem P2 naturally leads to a fully distributed per-cell implementation, without any CSI exchange across the cells or centralized transmit power update. An outline of the coordinated multi-cell MIMO WNV algorithm is provided in Algorithm 2 illustrated in FIG. 11.

Performance Bounds

Different from existing works on non-virtualized wireless networks, in the multi-cell MIMO WNV system described herein, the impact of imperfect CSI is two-fold on both the InP and the SPs. Therefore, in this section, new techniques are provided to derive the performance bounds for the online multi-cell MIMO WNV algorithm described herein. Performance bound analysis for the single-cell system is known.

Upper Bound on Virtual Queue

For performance bound analysis, it is assumed that the channel gain is bounded by a constant $B \geq 0$ at any time t, given by $$\|H(t)\|_F \leq B, \forall t. \quad (7)$$

With given channel estimation quality, it is assumed that the normalized CSI inaccuracy is bounded by a constant $\delta \geq 0$ at any t, given by $$\frac{\|\tilde{H}_{cl}^m(t)\|_F}{\|H_{cl}^m(t)\|_F} \leq \delta, \forall m \in \mathcal{M}, \forall c, l \in \mathcal{C}, \forall t \quad (8)$$

where $\tilde{H}_{cl}^m(t) \triangleq H_{cl}^m(t) - \hat{H}_{cl}^m(t)$ is the channel estimation error and $\hat{H}_{cl}^m(t)$ is the estimated channel state between SP m's users (i.e., wireless devices 22 served by SP m) in cell c and network node 16 in cell l. It follows that at each time t, the estimated channel gain is bounded by $$\|\hat{H}(t)\|_F \le B(1+\delta), \forall t. \qquad (9)$$

It is first shown in the following lemma that, the virtual $Z_c(t)$, $\forall c \in \mathcal{C}$ produced by Algorithm 2 is upper bounded at each time t.

Lemma 2. By Algorithm 2, $Z_c(t)$ satisfies $$Z_c(t) \le U\xi_c B^2(1+\delta)^2 + P_c^{max} - \bar{P}_c, \forall c \in \mathcal{C}, \forall t.$$

where $\xi_c \triangleq \sqrt{\dfrac{N_c \sum_{m \in M} P_c^m}{\bar{P}_c}}, \forall c \in \mathcal{C}.$ Note that Algorithm 2 and the upper bound on virtual queue in Lemma 2 apply to any precoding schemes adopted by the SPs.

Upper Bound on Virtualization Demand

In the following, two common precoding schemes are considered, maximum ratio transmission (MRT) and zero forcing (ZF) precoding. In each cell c, it is assumed that $M_c$ SPs adopt MRT precoding and the other SPs adopt ZF precoding. The analysis can be extended to other precoding schemes, e.g., minimum mean squared error (MMSE) precoding as well.

Specifically, let $\mathcal{M}'_c = \{1, \ldots, M'_c\}$ be the set of SPs that adopt MRT precoding in cell c. Each SP $m \in \mathcal{M}'_c$ uses the following MRT precoding matrix to maximize the received signal-to-noise ratio (SNR) given by $$\hat{W}_{cc}^{mMRT}(t) = \sqrt{P_c^m} \dfrac{\hat{H}_{cc}^{mH}(t)}{\|\hat{H}_{cc}^m(t)\|_F} \qquad (10)$$

Each SP $m \in \mathcal{M} \setminus \mathcal{M}'_c$ adopts ZF precoding to null the inter-user interference, where it is assumed that $K_c^m \le N_c$ to perform ZF precoding given by $$\hat{W}_{cc}^{mZF}(t) = \sqrt{P_c^m} \dfrac{\hat{H}_{cc}^{mH}(t)\left(\hat{H}_{cc}^m(t)\hat{H}_{cc}^{mH}(t)\right)^{-1}}{\sqrt{tr\left\{\left(\hat{H}_{cc}^m(t)\hat{H}_{cc}^{mH}(t)\right)^{-1}\right\}}} \qquad (11)$$

Let $\hat{H}_{cc}^m(t)\hat{H}_{cc}^{mH}(t) = \hat{Q}_c^m(t)\hat{\Omega}_c^m(t)\hat{Q}_c^{mH}(t)$, where $\hat{Q}_c^m(t)$ is a unitary matrix and $\hat{\Omega}_c^m(t) = \text{diag}\{\hat{\omega}_{c,1}^m(t), \ldots, \hat{\omega}_{c,K_c^m}^m(t)\}$. Let $D(t)$ and $\hat{D}(t)$ be the corresponding virtualization demands under accurate and inaccurate channel state, respectively, according to each SP's precoding scheme in (10) or (11). Below it is illustrated that given the CSI inaccuracy $\delta$ in (8), there is an upper bound $\mathcal{O}(\delta)$ on the deviation between the accurate and inaccurate virtualization demands $\|D(t)-\hat{D}(t)\|_F$. Note that the impact of inaccurate CSI on the SPs' virtualization demand under multi-cell MIMO WNV has not been studied in the literature.

Lemma 3. At each time t, $$\|D(t)\|_F \le \zeta B, \qquad (12)$$

$$\|\hat{D}(t)\|_F \le \zeta B(1+\delta), \qquad (13)$$

$$\|D(t) - \hat{D}(t)\|_F \le \eta B \delta \qquad (14)$$

where $$\zeta \triangleq \sqrt{\sum_{c \in \mathcal{C}} \sum_{m \in \mathcal{M}} P_c^m}, \eta \triangleq$$

$$\sqrt{\sum_{c \in \mathcal{C}} \left\{\sum_{m \in \mathcal{M}'_c}\left(1 + \dfrac{(2+\delta)B}{\hat{B}_c^{mmin}}\right)^2 P_c^m + \left(\dfrac{B^4(1+\delta)^2}{K_c^m \hat{\omega}_c^{mmin} \omega_c^{mmin}}\right)^2 P_c^m\right\}},$$

$$\hat{\omega}_c^{mmin} \triangleq$$

$\min\{\hat{\omega}_{c,i}^m(t): \forall i \in \mathcal{K}_c^m, \forall t\}$, $\omega_c^{mmin} \triangleq \min\{\omega_{c,i}^m(t): \forall i \in \mathcal{K}_c^m, \forall t\}$, in which $\omega_{c,i}^m(t)$ is similarly defined for $\hat{H}_{cc}^m(t)$, and $\hat{B}_c^{mmin} \triangleq \min\{\|\hat{H}_{cc}^m(t)\|_F; \forall t\}$.

Per-Slot Performance Gap

For channel state H(t) being i.i.d. over time, there exists a stationary randomized optimal precoding solution $V^{opt}(t)$ to P1 that achieves the minimum objective value of P1, denoted by $\rho^{opt}$. Define:

$$\phi(H(t), V(t), D(t)) \triangleq U\|H(t)V(t) - D(t)\|_F^2 + \sum_{c \in \mathcal{C}} Z_c(t)\|V_c(t)\|_F^2$$

and note that $\phi(\hat{H}(t), \hat{V}(t), \hat{D}(t))$ is the objective function in P2. Leveraging the results in Lemma 3, it is illustrated that in the following lemma that, at each time t, for a given CSI inaccuracy $\delta$ in (8), there exists an upper bound $\mathcal{O}(\delta)$ on $\phi(H(t), \hat{V}^*(t), D(t)) - \phi(H(t), V^{opt}(t), D(t))$. It bounds the per-slot performance gap between using the optimal solution $\hat{V}^*(t)$ to P2 under the inaccurate channel state $\hat{H}(t)$ and using the optimal solution $V^{opt}(t)$ to P1 under the accurate channel state H(t). The proof explicitly considers the two-fold impact of CSI inaccuracy on both InP and SPs under multi-cell MIMO system, which existing system fail to do.

Lemma 4. At each time t:

$$\phi(H(t), \hat{V}^*(t), D(t)) - \phi(H(t), V^{opt}(t), D(t)) \le U\varphi$$

where $$\varphi \triangleq 2\left[(2+\delta)\left(\sum_{c \in \mathcal{C}} P_c^{max} + \zeta\eta\right) + 2(\zeta(1+\delta) + \eta)\sqrt{\sum_{c \in \mathcal{C}} P_c^{max}}\right]B^2\delta = \mathcal{O}(\delta),$$

and $\zeta$, $\eta$ are defined in Lemma 3.

System Performance Bounds

Leveraging the key results in Lemma 4, it is illustrated that the expected DPP metric over the virtual queue Z(t) under the accurate channel state H(t) using the optimal precoding solution $\hat{V}^*(t)$ to P2 is upper bounded at each time t. The analysis extends the standard DPP metric analysis under the accurate system state to accommodate the two-fold impact of inaccurate channel state $\hat{H}(t)$ on both the InP and the SPs in our multi-cell MIMO WNV problem.

Lemma 5. At each time t:

$$\mathbb{E}\{\Delta(t)\} + U\mathbb{E}\left\{\left\|H(t)\hat{V}^*(t) - D(t)\right\|_F^2\right\} \leq U\mathbb{E}\left\{\left\|H(t)V^{opt}(t) - D(t)\right\|_F^2\right\} + U\varphi + S$$

where φ is defined in Lemma 4 and S is defined in Lemma 1.

Leveraging the results in Lemma 2 and Lemma 5, the following theorem provides performance bounds for Algorithm 2 with imperfect CSI over any given time horizon T. The proof utilizes the Lyapunov optimization techniques and key results in Lemma 2 and Lemma 5.

Theorem 6. Given any $$\epsilon > 0, \text{ set } U = \frac{S}{\epsilon}$$

in Algorithm 2. For any T>0, for $\hat{V}^*(t)$ produced by Algorithm 2 with $\hat{H}(t)$, the following hold for any $c \in \mathcal{C}$ regardless of the distribution of H(t):

$$\frac{1}{T}\sum_{t=0}^{T-1}\mathbb{E}\left\{\left\|H(t)\hat{V}^*(t) - D(t)\right\|_F^2\right\} \leq \rho^{opt} + \varphi + \epsilon,$$

$$\frac{1}{T}\sum_{t=0}^{T-1}\left\|\hat{V}_c^*(t)\right\|_F^2 \leq \bar{P}_c + \frac{SB^2(1+\delta)^2\xi_c + \epsilon(P_c^{max} - \bar{P}_c)}{\epsilon T}$$

where $\rho^{opt}$ is the minimum objective value of P1 under H(t), $\varphi = \mathcal{O}(\delta)$ is defined in Lemma 4, and $\xi_c$ is defined in Lemma 2.

Note that, different from the standard $$\left(\epsilon, \frac{1}{\epsilon}\right)$$

trade-off in Lyapunov optimization with accurate system state information, a trade-off bound $$\left(\epsilon + \mathcal{O}(\delta), \frac{1}{\epsilon}\right)$$

with the two-fold impact of imperfect CSI on multi-cell MIMO system is provided herein. Theorem 6 provides an upper bound on the objective value of P1, i.e., the time-averaged expected deviation of the actual coordinated precoding by the InP from the virtualization demand under inaccurate channel state. It indicates that, for any given T, the performance of Algorithm 2 using inaccurate channel state $\hat{H}(t)$ can be arbitrarily close to the optimum achieved with accurate channel state $\hat{H}(t)$ plus $\mathcal{O}(\delta)$, where the performance gap ϵ is a controllable parameter by the design described herein and can be set arbitrarily small. Furthermore, Theorem 6 provides a bound on the per-cell time-averaged transmit power for any given T. The bound indicates that for all $$T \geq \frac{1}{\epsilon^2},$$

Algorithm 2 guarantees that the deviation from the long-term transmit power limit $\bar{P}_c$ at each cell c is within $\mathcal{O}(\epsilon)$. In particular, as T→∞, the long-term averaged transmit power constraint at each cell is satisfied.

Simulation Results

In this section, extensive simulation results under typical urban micro-cell LTE network settings are provided. The impact of various system parameters on algorithm convergence and performance was studied. For single-cell MIMO system, it has been demonstrated that the spatial isolation approach used in the present disclosure substantially outperforms the physical isolation approach used in other existing MIMO WNV studies, in terms of throughput and energy consumption. Indeed, the strict service isolation approach suffers performance loss by physically slicing the wireless resources, in exchange for achieving network virtualization. One or more embodiments described herein are focused on demonstrating that the spatial isolation approach used herein compares favorably against a frequency division virtualization approach in the multi-cell MIMO system.

Simulation Setup

An example of an InP that owns a virtualized network having C=7 cells is considered. The InP-owned network node 16 is equipped with $N_c$=32 antennas at the center of each urban hexagon micro-cell c of $R_c$=500 m radius. The InP serves M=4 SPs. Each SP m serves $K_c^m$=2 wireless devices 22 uniformly distributed in each cell c. Following the typical LTE specifications, the following are set: the maximum transmit power limit $P_c^{max}$=33 dBm, $\forall c \in \mathcal{C}$, noise power spectral density $N_0$=−174 dBm/Hz, noise figure $N_F$=10 dB, and focus on the channel over one subcarrier with bandwidth $B_W$=15 kHz as default system parameters. The fading channel from network node 16 in cell c to wireless device 22 k is modeled as $\beta_c^k$[dB]=−31.54−33 $\log_{10}$ $d_c^k - \psi_c^k$, where path-loss and shadowing is represented, with $d_c^k$ being the distance in kilometers from network node 16 in cell c to wireless device 22 k and $\psi_c^k \sim \mathcal{CN}(0, \sigma_\varnothing^2)$ being the shadowing with $\sigma_\varnothing$=8 dB. It is assumed that the channel state estimation error is Gaussian distributed with standard deviation $e_H$ from the mean of the accurate channel state. Example default network parameters are summarized in Table I.

TABLE I

Default Network Parameters

| Parameter | Value | Parameter | Value |
| --- | --- | --- | --- |
| C | 7 | $R_c$ | 500 m |
| M | 4 | $N_c$ | 32 |
| $K_c^m$ | 2 | BW | 15 kHz |
| $N_0$ | −174 dBm/Hz | NF | 10 dB |
| $P_c^{max}$ | 33 dBm | $\bar{P}_c$ | 31 dBm |

To study the performance of Algorithm 2, the normalized time-averaged precoding deviation from the virtualization demand is defined as $$\bar{\rho}(T) \triangleq \frac{\frac{1}{T}\sum_{t=0}^{T-1}\left\|H(t)\hat{V}^*(t)-D(t)\right\|_F^2}{\frac{1}{T}\sum_{t=0}^{T-1}\|D(t)\|_F^2}$$

and the average per-cell transmit power as $$\bar{P}(T) \triangleq \frac{1}{TC}\sum_{t=0}^{T-1}\left\|\hat{V}^*(t)\right\|_F^2.$$

It is assumed that the InP allocates the transmit power $$P_c^m = \frac{P_c^{max}}{M}$$

to each SP m such that $\Sigma_{m\in\mathcal{M}} P_c^m = P_c^{max}$, $\forall c \in \mathcal{C}$. For $\bar{P}_{\hat{V}^*}(T)$ defined above, $\|D(t)\|_F^2 \leq \zeta^2 B^2$, based on the performance upper bound in (12), $\epsilon = \theta\zeta^2 B^2$ is set where $\theta$ is used as a controllable parameter. Also, $$B = 1.645\sqrt{\Sigma_{c\in\mathcal{C}} N_c \Sigma_{k\in\mathcal{K}_c} \beta_c^k}$$

is set which gives a Chernoff upper bound of $4.9\times10^{-12}$ for the probability of bound violation $\mathbb{P}\{\|H(t)\|_F > B\}$. Note that by setting e properly, algorithm described herein does not need the values of channel gain upper bound B in (7) and CSI inaccuracy upper bound δ in (8) to run.

Effect of Weighting Factor U

Figure 12:
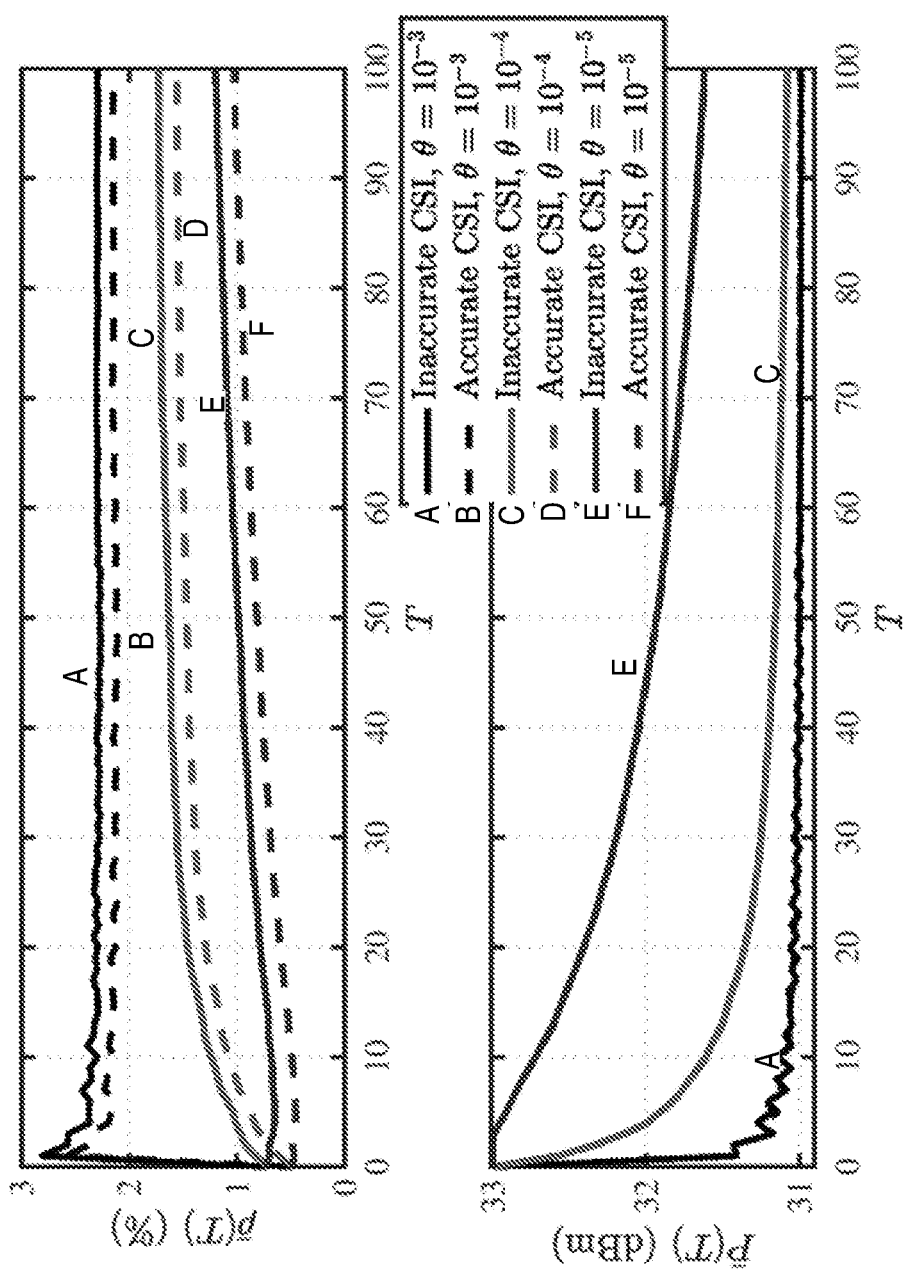
FIG. 12 is a diagram of $\bar{\rho}(T)$ and $\bar{P}(T)$ vs. T with different $\theta$ when all SPs adopt MRT precoding according to some embodiments of the present disclosure.
Figure 13:
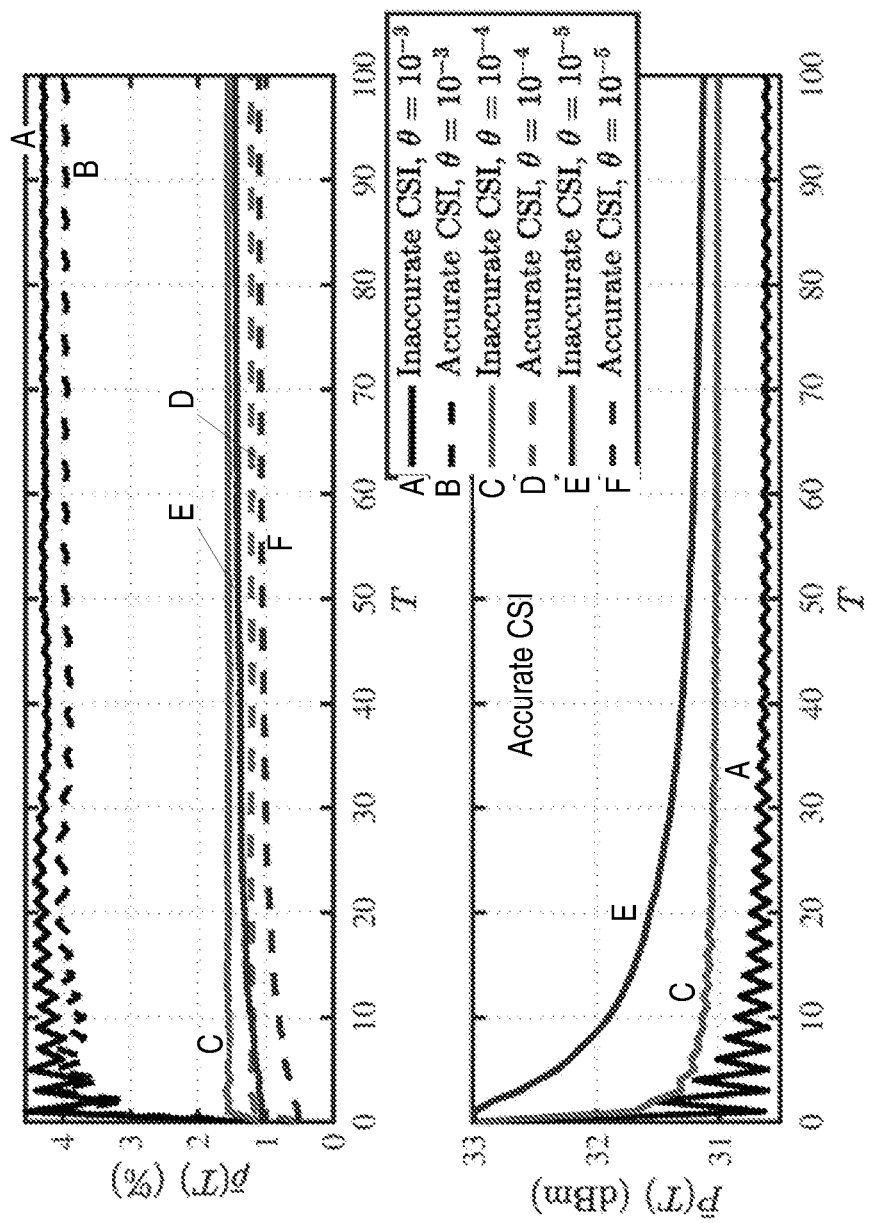
FIG. 13 is a diagram of $\bar{\rho}(T)$ and $\bar{P}(T)$ vs. T with different $\theta$ when all SPs adopt ZF precoding according to some embodiments of the present disclosure.
Figure 14:
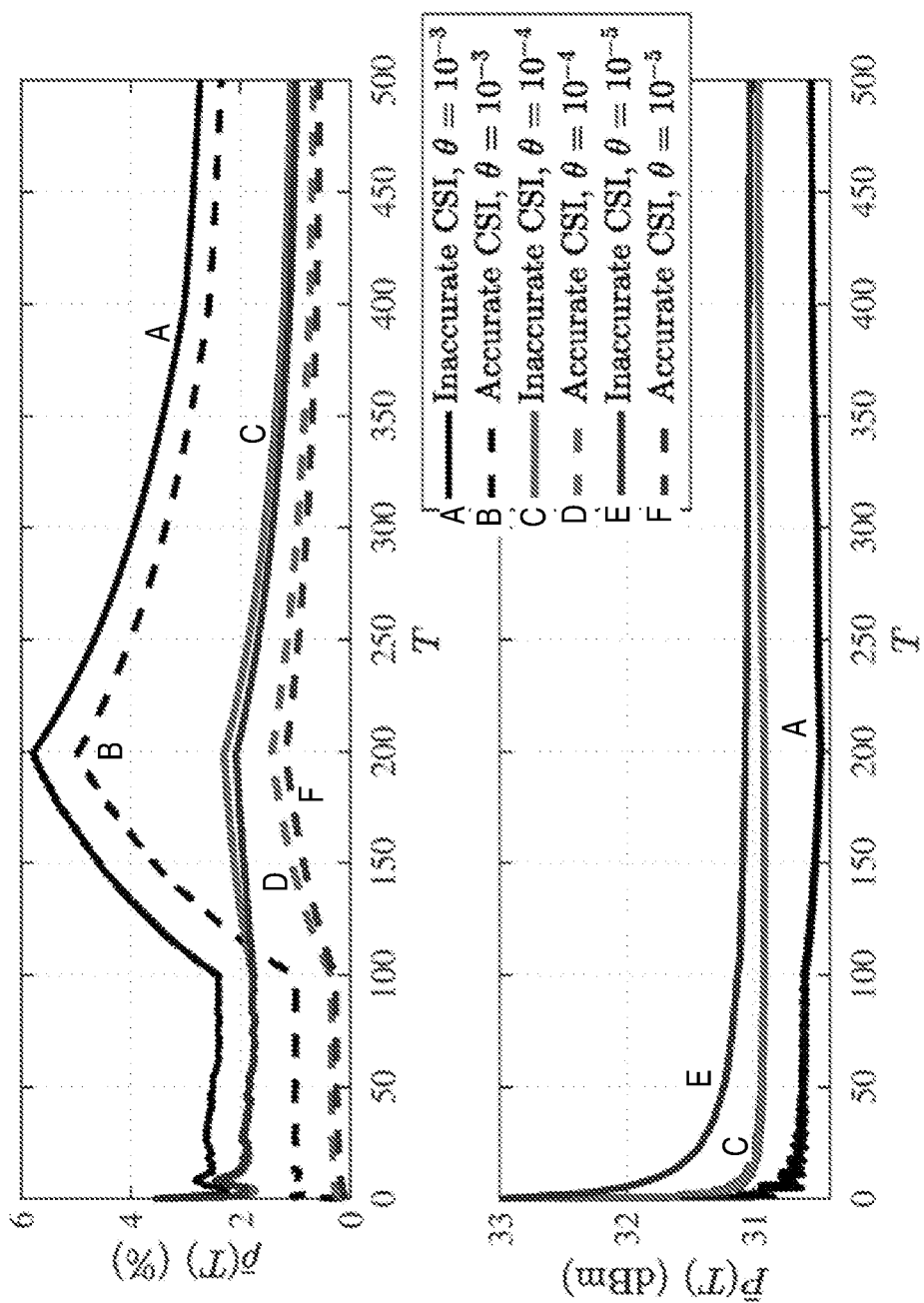
FIG. 14 is a diagram of $\bar{\rho}(T)$ and $\bar{P}(T)$ vs. T with different $\theta$ when half of the SPs adopt MRT precoding and the other half of the SPs adopt ZF precoding (channel distribution changes every 100 time slots) according to some embodiments of the present disclosure.

The effect of weighting factor $$U = \frac{s}{\epsilon}$$

on the performance is studied by varying $\epsilon$ through θ. FIG. 12 and FIG. 13 illustrate the time trajectories of $\bar{\rho}(T)$ and $\bar{P}(T)$ under different values of θ, for $\bar{P}_c=31$ dBm and $e_H=10\%$, when all SPs adopt MRT and ZR precoding, respectively. The algorithm described herein is observed to converge quickly (within 100 time slots). As θ decreases, U becomes larger, and more emphasis is on the precoding deviation $\hat{\rho}(t)$, and less on the Lyapunov drift Δ(t) in the DPP metric. As a result, it takes a longer time for the virtual queue to stabilize, and thus the performance to reach the steady-state. Furthermore, at convergence, $\hat{\rho}(T)$ decreases as θ is decreasing, and $\bar{P}(T)$ converges to $\bar{P}_c$. These are consistent with Theorem 6. FIG. 14 illustrates the algorithm performance under a practical scenario where the SPs are free to adopt either MRT or ZF precoding, and the channel distribution changes over time (e.g., due to mobility). The algorithm described herein can track the change of channel distribution while limiting $\bar{\rho}(T)$ under 2% when $\theta=10^{-4}$. As such, we set $\theta=10^{-4}$ as the default value for the rest of the simulation.

Performance Vs. Long-Term Transmit Power Limit $\bar{P}_c$

Figure 15:
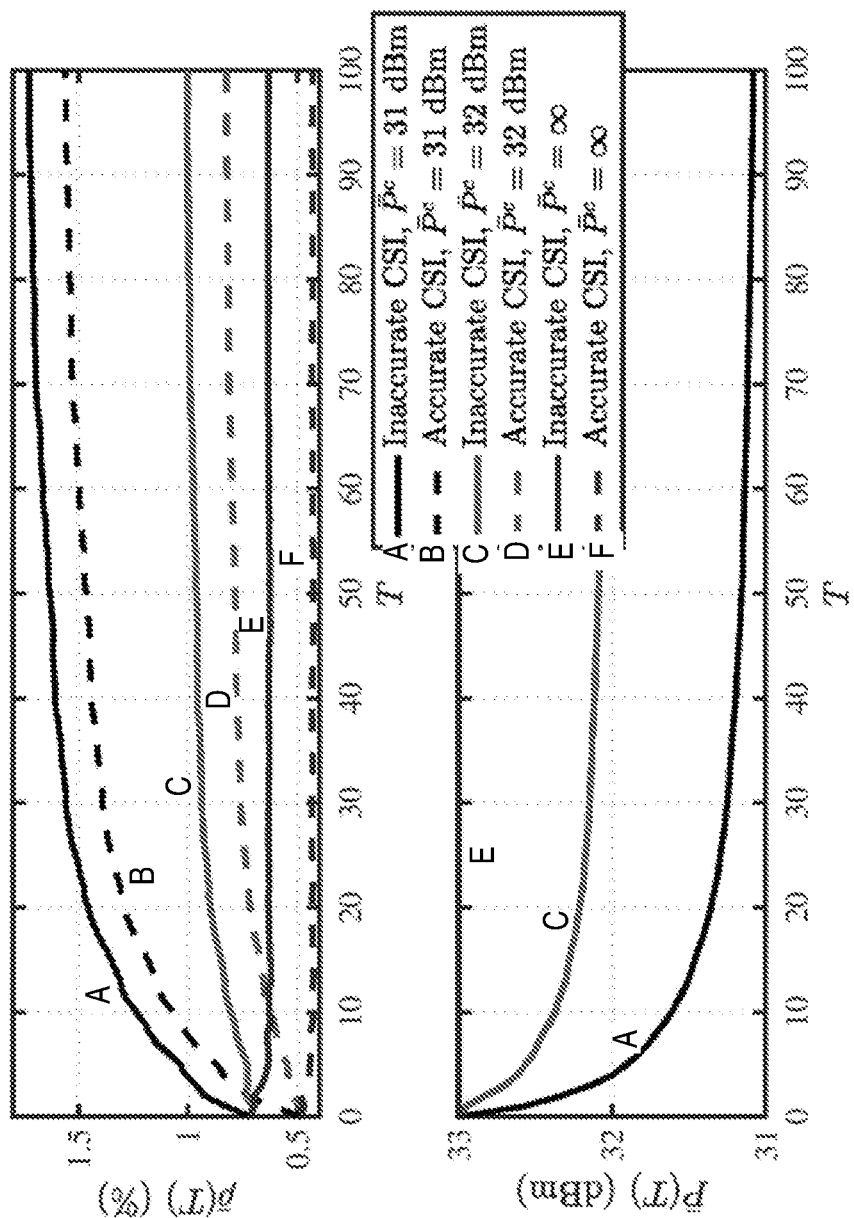
FIG. 15 is a diagram of $\bar{\rho}(T)$ and $\bar{P}(T)$ vs. T with different $\bar{P}_c$ when all SPs adopt MRT precoding according to some embodiments of the present disclosure.
Figure 16:
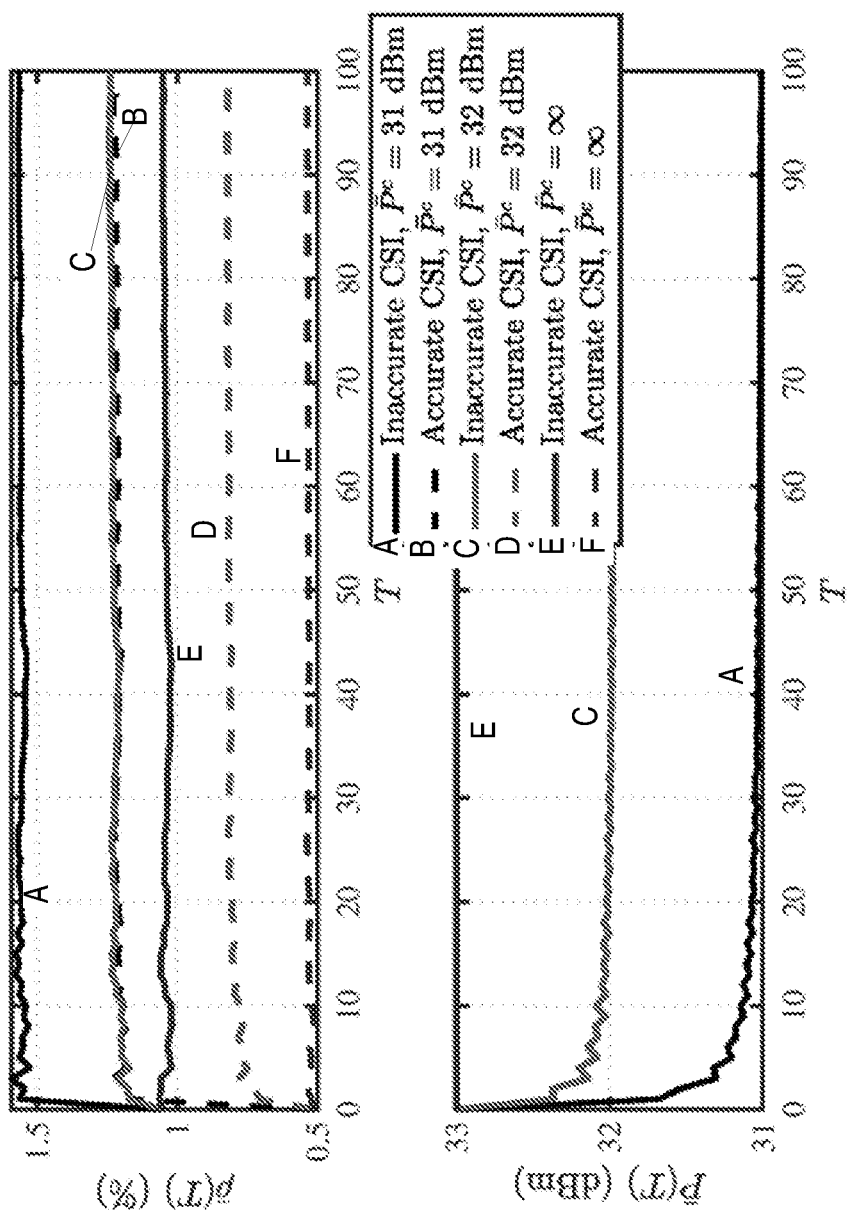
FIG. 16 is a diagram of $\bar{\rho}(T)$ and $\bar{P}(T)$ vs. T with different $\bar{P}_c$ when all SPs adopt ZF precoding according to some embodiments of the present disclosure.

FIG. 15 and FIG. 16 illustrate the time trajectories of $\bar{\rho}(T)$ and $\bar{P}(T)$ under different values of the per-cell long-term transmit power limit $\bar{P}_c$, when all SPs adopt either MRT or ZF precoding respectively. The case of $\bar{P}_c=\infty$ corresponds to removing the long-term average transmit power constraint (2) from P1, such that the precoding design is subject to the short-term transmit power constraint (3) only. Since the SPs design the virtual precoding matrixes requesting the maximum transmit power $P_c^{max}=33$ dBm without considering the inter-SP interference, the InP cannot perfectly meet the virtualization demand from the SPs. As such, the InP uses maximum transmit power $P_c^{max}$ for downlink precoding design to meet the virtualization demand from the SPs. At steady state, $\bar{\rho}(T)$ is around 1% when $\bar{P}_c=\infty$ for both the MRT and ZF precoding cases. When $\bar{P}_c=31$ dBm, the steady-state value of $\bar{\rho}(T)$ is only around 2% for both cases. Note that there is a natural trade-off between $\bar{P}_c$ and $\bar{\rho}(T)$, which allows the InP to balance the transmit power consumption and the deviation of actual precoding from the virtualization demand.

Performance vs. CSI Inaccuracy

Figure 17:
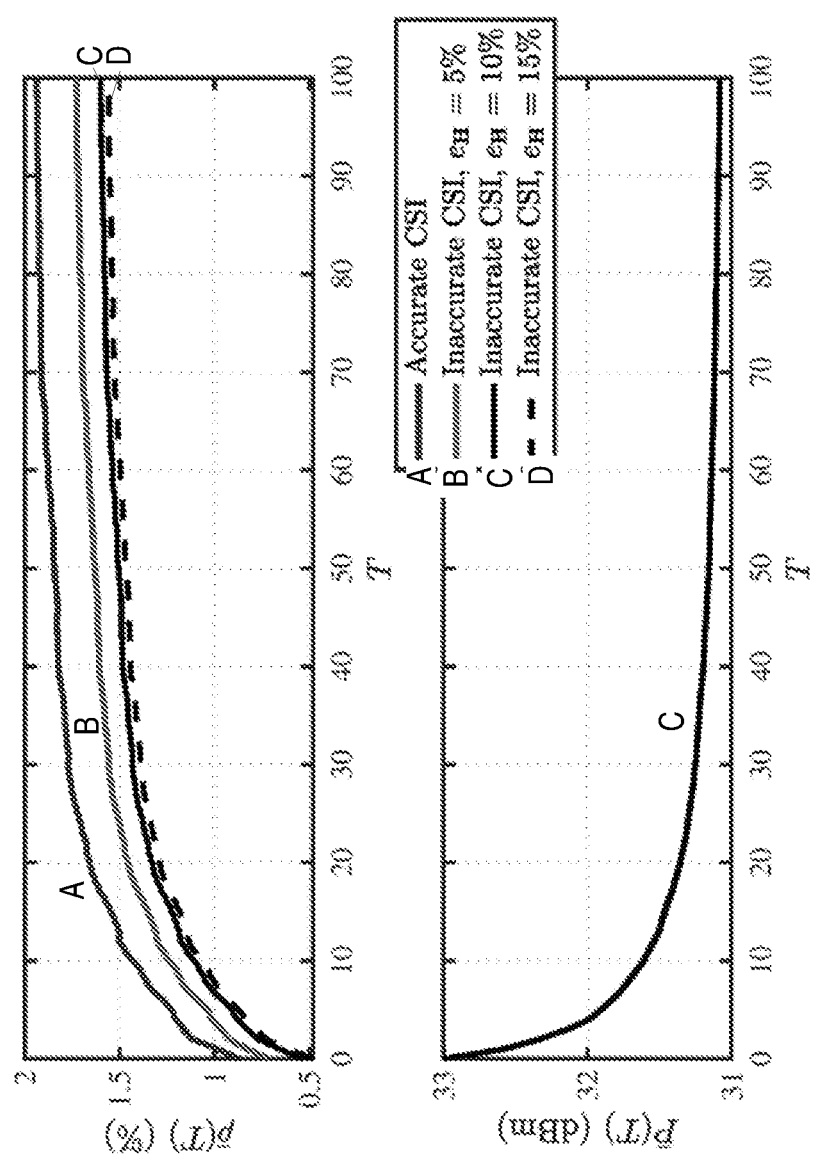
FIG. 17 is a diagram of $\bar{\rho}(T)$ and $\bar{P}(T)$ vs. T with different $e_H$ when all SPs adopt MRT precoding according to some embodiments of the present disclosure.
Figure 18:
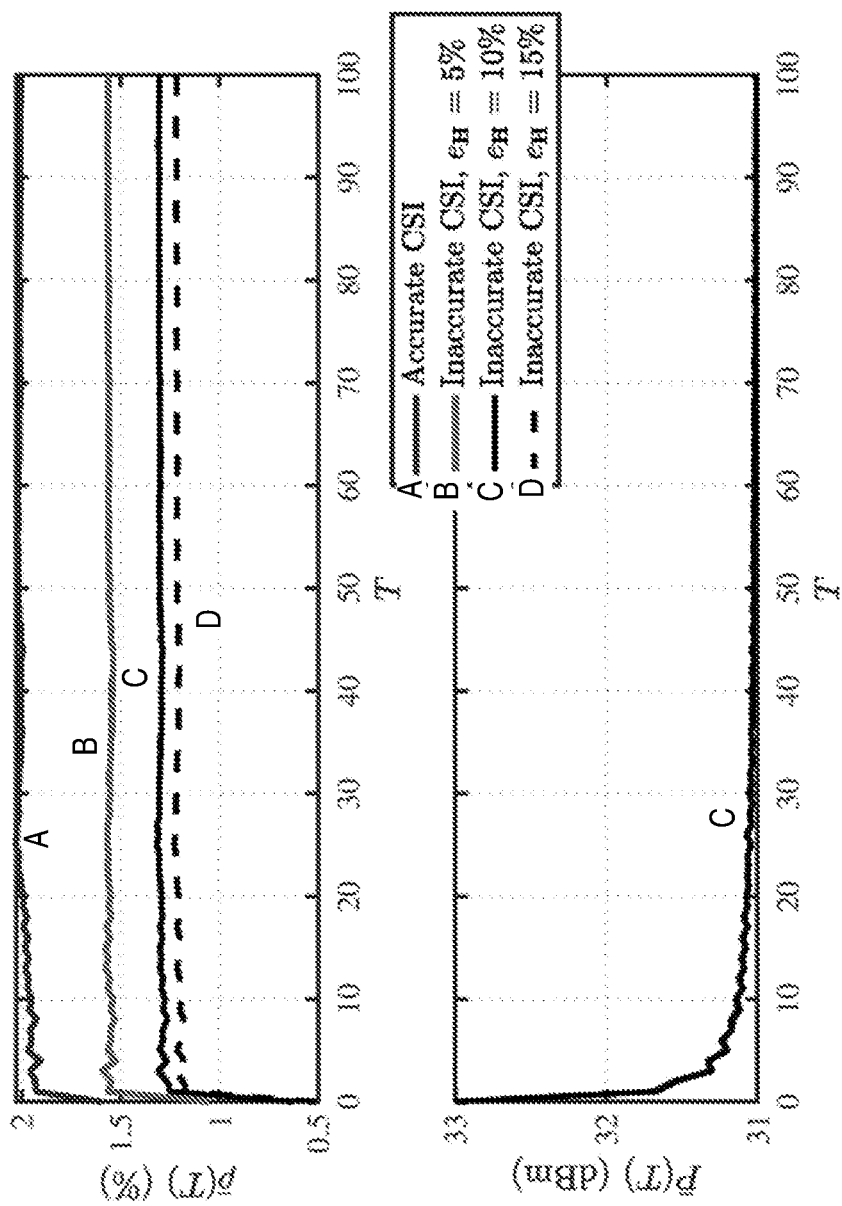
FIG. 18 is a diagram of $\bar{\rho}(T)$ and $\bar{P}(T)$ vs. T with different $e_H$ when all SPs adopt ZF precoding according to some embodiments of the present disclosure.

In FIG. 17 and FIG. 18, examples of the impact of CSI inaccuracy on the performance by varying $e_H$ are illustrated. As $e_H$ increases from 5% to 15%, the steady-state values of $\bar{\rho}(T)$ is still under 2% for both precoding schemes, showing the robustness of the algorithm performance to CSI inaccuracy. It is observed that $\bar{\rho}(T)$ is more sensitive to $e_H$ when all SPs adopt ZF precoding, as compared to the MRT precoding case. The reason is that ZF precoding nulls the inter-user interference and thus its performance is more sensitive to CSI inaccuracy compared with MRT precoding. The steady-state value of $\bar{P}(T)$ is not sensitive to the value of $e_H$.

Performance vs. Number of Antennas $N_c$

Figure 19:
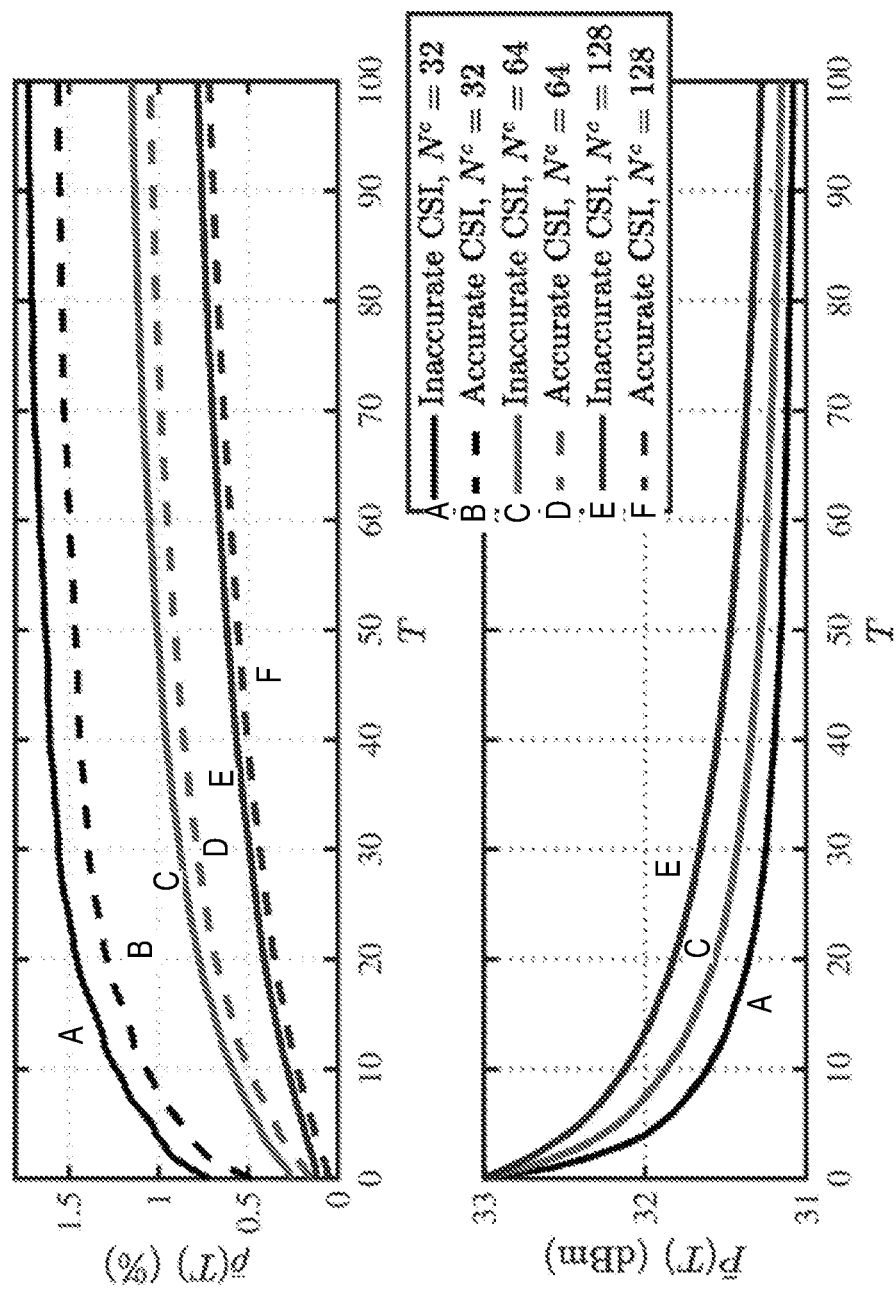
FIG. 19 is a diagram of $\bar{\rho}(T)$ and $\bar{P}(T)$ vs. T with different $N_c$ when all SPs adopt MRT precoding according to some embodiments of the present disclosure.
Figure 20:
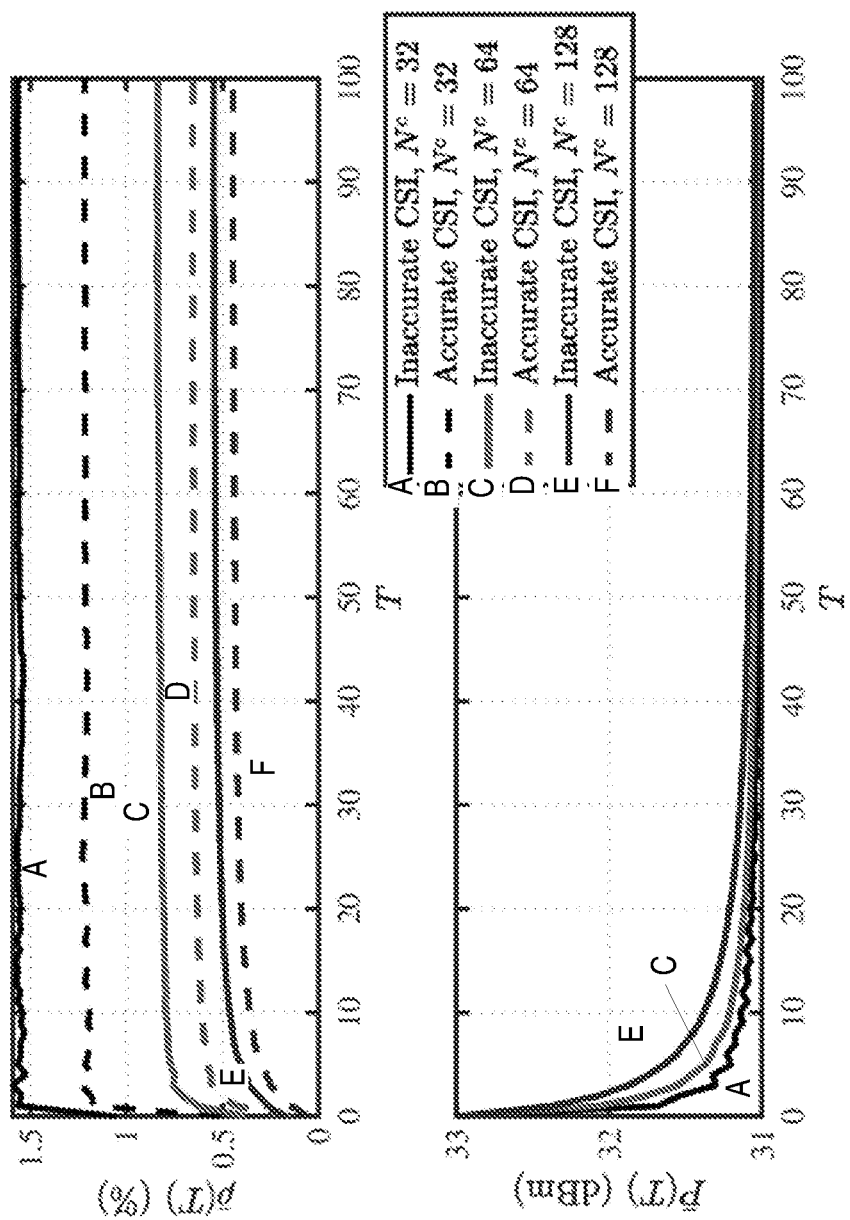
FIG. 20 is a diagram of $\bar{\rho}(T)$ and $\bar{P}(T)$ vs. T with different $N_c$ when all SPs adopt ZF precoding according to some embodiments of the present disclosure.

FIG. 19 and FIG. 20 illustrate examples of the algorithm performance with different numbers of network node 16 antennas $N_c$. As the number of network node 16 antennas increases, at the steady state, $\bar{\rho}(T)$ decreases since the InP has more freedom in choosing the antennas for downlink beamforming to mitigate both the inter-SP and inter-cell interference, and thus the deviation from the virtualization demand decreases. Besides, the performance gap between the inaccurate and accurate CSI cases also shrinks as the number of network node 16 antennas increases, indicating the advantages of massive MIMO in a virtualized network. The impacts of the number of network node 16 antennas on the algorithm convergence and $\bar{P}(T)$ are observed to be negligible, showing that the algorithm applies to massive MIMO.

Benefit of Service Isolation Via Spatial Virtualization

There are no existing online methods for virtualization in multi-cell MIMO systems. For traditional non-virtualized multi-cell systems, existing coordinated precoding schemes focus on per-slot optimization problems. That is, the coordinated precoding solution is for virtualized MIMO systems, but focuses on per-slot problems. Therefore, existing per-slot precoding solutions are not comparable with the online solution described herein. Note that most existing works on MIMO WNV adopt the physical isolation approach to separate the SPs. Therefore, for performance comparison, a physical isolation scheme for online multi-cell MIMO WNV is implemented. Specifically, a frequency division (FD) scheme is considered that allocates equal bandwidth $$\frac{B_W}{M}$$

to each SP m. The online coordinated precoding solution described herein is then used to serve each SP, which is a special case of Algorithm 2 with a single SP, maximum power limits $$\left\{\frac{P_c^{max}}{M}\right\},$$

and long-term power limits $$\left\{\frac{\bar{P}_c}{M}\right\}.$$

Figure 21:
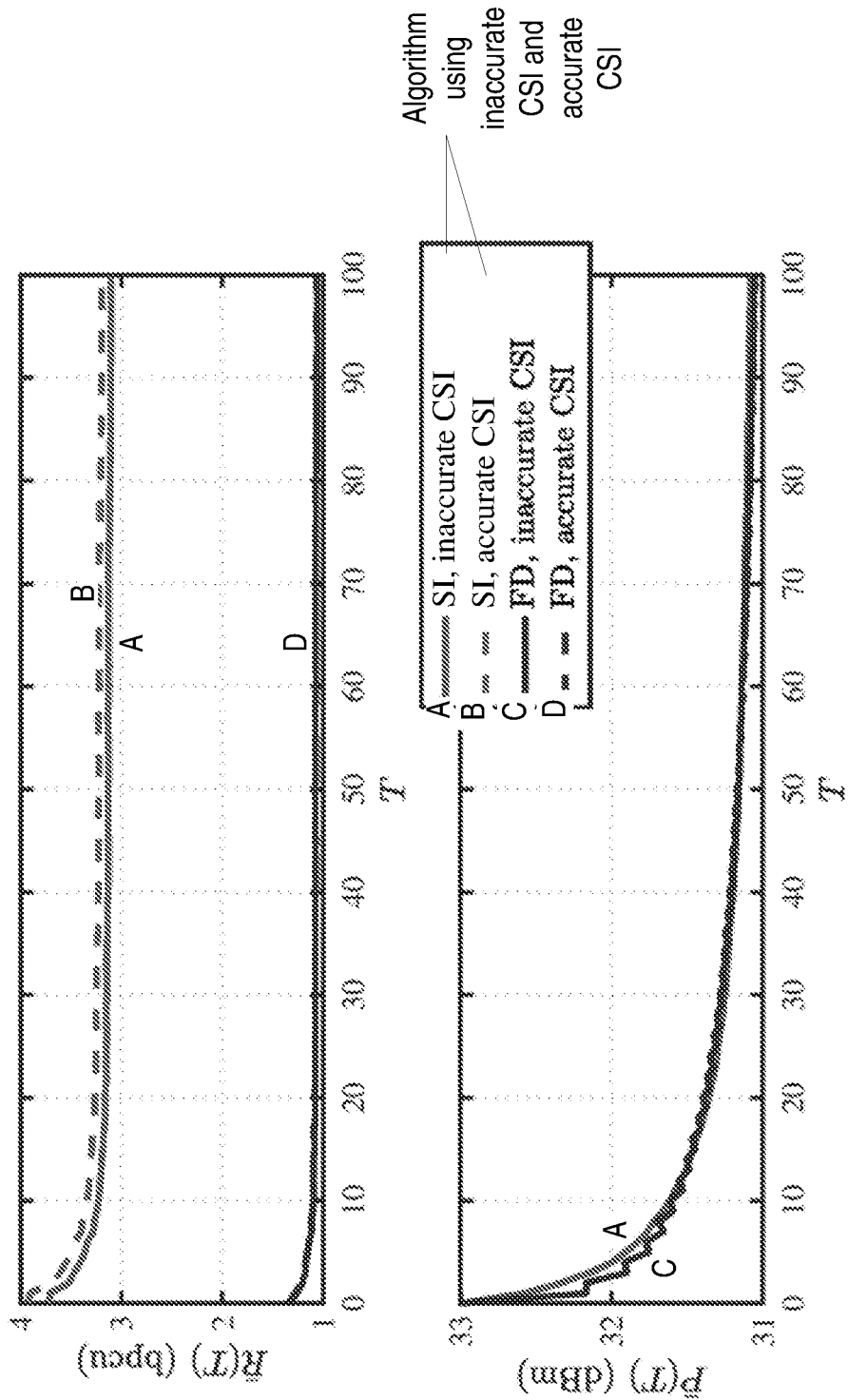
FIG. 21 is a diagram of a comparison of $\bar{R}(T)$ between the process of the present disclosure and FD virtualization schemes with MRT precoding according to some embodiments of the present disclosure.
Figure 22:
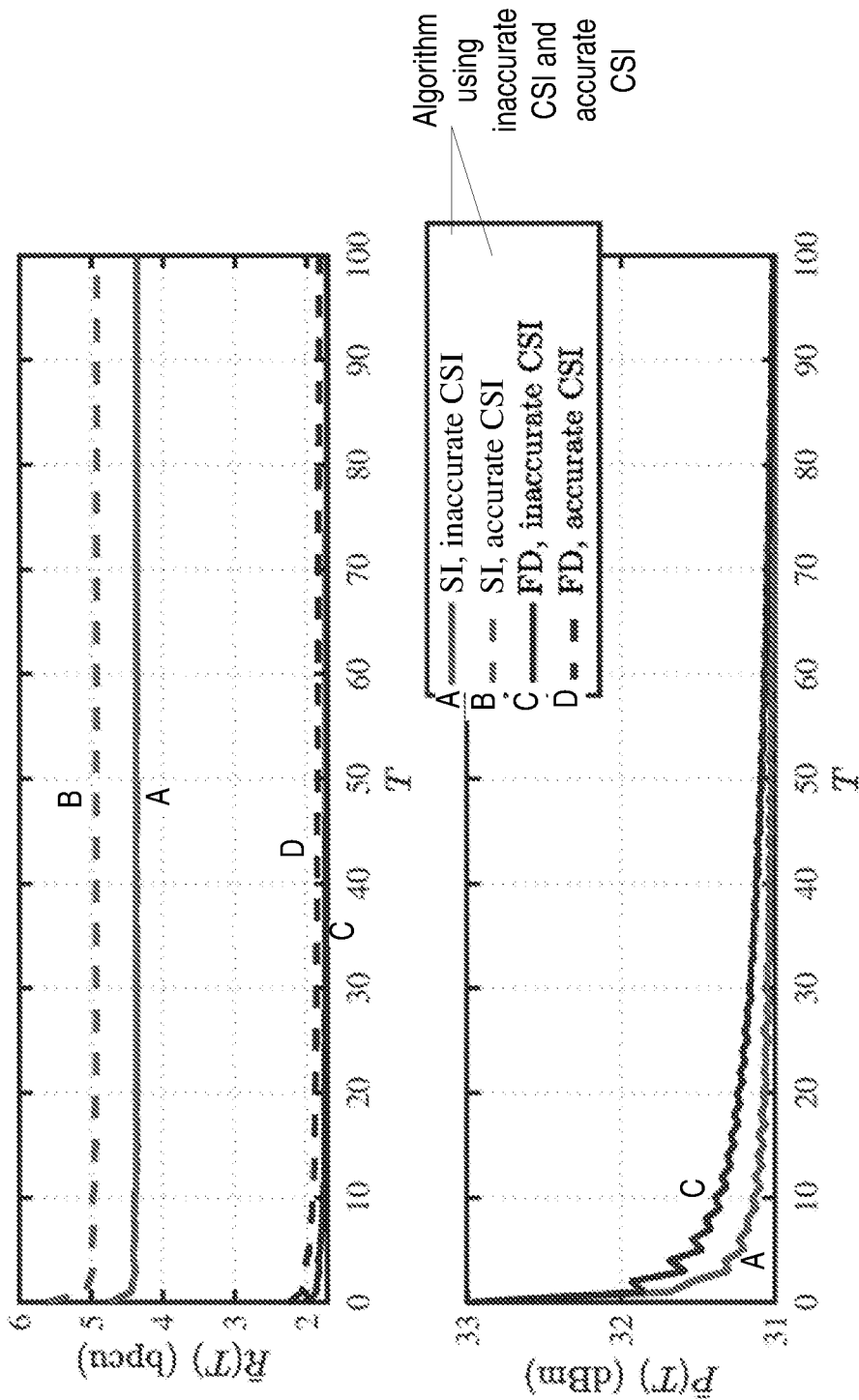
FIG. 22 is a diagram of a comparison of $\bar{R}(T)$ between the process of the present disclosure and FD virtualization schemes with ZF precoding according to some embodiments of the present disclosure.

FIG. 21 and FIG. 22 illustrate the time-averaged per-user rate $$\bar{R}(T) \triangleq \frac{1}{TK}\sum_{t=0}^{T-1}\sum_{k\in\mathcal{K}}\log_2\left(1+\frac{\left|[H(t)\hat{V}^*(t)]_{k,k}\right|^2}{\sum_{k'\in\mathcal{K}, k'\neq k}\left|[H(t)\hat{V}^*(t)]_{k,k'}\right|^2+\sigma_n^2}\right)$$

achieved by the spatial isolation approach in accordance with the teachings of the present disclosure (i.e., labelled "SI" in FIGS. 21 and 22), as well as that by the FD approach. Note that all rates are normalized by the system bandwidth $B_W$. For both the MRT and ZF precoding cases, $\bar{R}(T)$ in both networks quickly converges to its steady state. It is observed that the achieved rate by the spatial isolation approach is much higher than that of the FD approach. This indicates substantial performance advantage of the spatial isolation approach over the physical isolation approach in multi-cell MIMO systems.

The Disclosure Provides One or More of the Following Advantages:

Online downlink coordinated precoding design for WNV in multi-cell MIMO fading systems with unknown CDI and imperfect CSI is described herein. In each cell, each SP is allowed to use all antennas and wireless spectrum resources. Each SP demands its virtual precoding based on the needs of its wireless devices 22, without considering either the inter-SP interference or the inter-cell interference. The InP coordinates the cells at the precoding level to perform online virtualization.

A coordinated precoding scheme for online multi-cell MIMO WNV is provided. One goal at the InP is to minimize the long-term time-averaged expected deviation of the InP's actual precoding from the virtualization demand set by the SPs, subject to both long-term and short-term transmit power constraints at each cell.

The coordinated precoding solution naturally leads to fully distributed implementation at each cell, without any CSI exchange across the cells or central transmit power control. One or more embodiments described herein, at each cell, is in a semi-closed form, and may only depend on the current imperfect CSI, without knowledge of the CDI.

The analysis advantageously considers the two-fold impact of imperfect CSI on both the InP and SPs in the multi-cell system. It is shown that $\mathcal{M}(\delta)$ is the optimality gap over any given time horizon, where $\delta$ is a normalized CSI inaccuracy measure. And the long-term transmit power constraint at each cell is satisfied in the long run.

With respect to one or more embodiments, the performance of the algorithm described/provided herein is validated under typical LTE network settings. The impacts of different precoding schemes adopted by the SPs, average per-cell BS power limit, channel inaccuracy, and the number of network node 16 antennas on algorithm performance have been considered. The online algorithm converges quickly and is robust to CSI inaccuracy. Through rate comparison in the multi-cell MIMO system, the WNV scheme described herein substantially outperforms a FD virtualization approach.

EXAMPLES

Example A1. An infrastructure network node (16) for providing a virtual multiple-input multiple-output, MIMO, cellular network supporting a plurality of network nodes (16) associated with a plurality of service providers, SPs, the infrastructure network node (16) configured to, and/or comprising a radio interface and/or comprising processing circuitry (68) configured to:
  determine a downlink coordinated precoder for online multi-cell MIMO wireless network virtualization, WNV, the downlink coordinated precoder being based at least on imperfect channel state information, CSI; and
  optionally indicate the downlink coordinated precoder.

Example A2. The infrastructure network node (16) of Example A1, wherein the downlink coordinating precoder is a global precoding matrix associated with the plurality of network nodes (16), the downlink coordinating precoder being configured to reduce an average deviation between the downlink coordinating precoder and at least one virtual local precoder associated with at least one network node.

Example A3. The infrastructure network node (16) of any one of Examples A1 and A2, wherein the plurality of network nodes (16) are independent of each other, each network node (16) being associated with a respective SP and respective virtualization demand.

Example A4. The infrastructure network node (16) of any one of Examples A1-A3, wherein the downlink coordinated precoding is configured to mitigate inter-SP interference.

Example A5. The infrastructure network node (16) of any one of Examples A1-A4, further comprising a plurality of antennas, the plurality of network nodes (16) being configured to share the plurality of antennas and wireless spectrum resources.

Example B1. A method implemented in an infrastructure network node, the infrastructure node providing a virtual multiple-input multiple-output, MIMO, cellular network supporting a plurality of network nodes (16) associated with a plurality of service providers, SPs, the method comprising:
  determining a downlink coordinated precoder for online multi-cell MIMO wireless network virtualization, WNV, the downlink coordinated precoder being based at least on imperfect channel state information, CSI; and
  optionally indicating the downlink coordinated precoder.

Example B2. The method of Example B1, wherein the downlink coordinating precoder is a global precoding matrix associated with the plurality of network nodes (16), the downlink coordinating precoder being configured to reduce an average deviation between the downlink coordinating precoder and at least one virtual local precoder associated with at least one network node.

Example B3. The method of Examples B1 and B2, wherein the plurality of network nodes (16) are independent of each other, each network node (16) being associated with a respective SP and respective virtualization demand.

Example B4. The method of any one of Examples B1-B3, wherein the downlink coordinated precoding is configured to mitigate inter-SP interference.

Example B5. The method of any one of Examples B1-B4, where the plurality of network nodes (16) are configured to share a plurality of antennas and wireless spectrum resources.

Example C1. A first network node (16) configured to communicate with an infrastructure network node (16) that is configured to provide a virtual multiple-input multiple-output, MIMO, cellular network supporting a plurality of network nodes (16) associated with a plurality of service providers, SPs, the plurality of network nodes (16) including the first network node, the first network node (16) configured to, and/or comprising a radio interface and/or processing circuitry (68) configured to:
- determine a virtual local precoder for downlink communication based at least on a local virtualization demand; and
- receive an indication of a downlink coordinated precoder for online multi-cell MIMO wireless network virtualization, WNV, the downlink coordinated precoder being based at least on imperfect channel state information, CSI and the virtual local precoder.

Example C2. The first network node (16) of Example C1, wherein the downlink coordinating precoder is a global precoding matrix associated with the plurality of network nodes (16), the downlink coordinating precoder being configured to reduce an average deviation between the downlink coordinating precoder and the virtual local precoder associated with the first network node.

Example C3. The first network node (16) of any one of Examples C1 and C2, wherein the first network node (16) is independent of the plurality of network nodes (16), each network node (16) being associated with a respective SP and respective virtualization demand.

Example C4. The first network node (16) of any one of Examples C1-C3, wherein the downlink coordinated precoding is configured to mitigate inter-SP interference.

Example C5. The first network node (16) of any one of Examples C1-C4, wherein the first network node (16) is configured to share a plurality of antennas and wireless spectrum resources with the plurality of network nodes (16).

Example D1. A method implemented in a first network node (16) that is configured to communicate with an infrastructure network node (16) that is configured to provide a virtual multiple-input multiple-output, MIMO, cellular network supporting a plurality of network nodes (16) associated with a plurality of service providers, SPs, the method comprising:
- determining a virtual local precoder for downlink communication based at least on a local virtualization demand; and
- receiving an indication of a downlink coordinated precoder for online multi-cell MIMO wireless network virtualization, WNV, the downlink coordinated precoder being based at least on imperfect channel state information, CSI and the virtual local precoder.

Example D2. The method of Example D1, wherein the downlink coordinating precoder is a global precoding matrix associated with the plurality of network nodes (16), the downlink coordinating precoder being configured to reduce an average deviation between the downlink coordinating precoder and the virtual local precoder associated with the first network node.

Example D3. The method of any one of Examples D1 and D2, wherein the first network node (16) is independent of the plurality of network nodes (16), each network node (16) being associated with a respective SP and respective virtualization demand.

Example D4. The method of any one of Examples D1-D3, wherein the downlink coordinated precoding is configured to mitigate inter-SP interference.

Example D5. The method of any one of Examples D1-D4, wherein the first network node (16) is configured to share a plurality of antennas and wireless spectrum resources with the plurality of network nodes (16).

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:
CDI Channel Distribution Information
CSI Channel State Information
DP Dynamic Programming
DPP Drift Plus Penalty
FD Frequency Division
I.I.D. Independent and Identically Distributed
InP Infrastructure Provider
LTE Long-Term Evolution
MIMO Multiple-Input Multiple-Output
MRT Maximum Ratio Transmission
MMSE Minimum Mean Squared Error
SNR Signal-to-Noise Ratio
SP Service Provider
TRP Transmission Reception Point
WNV Wireless Network Virtualization
ZF Zero Forcing It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. An infrastructure network node for providing a virtual multiple-input multiple-output (MIMO) cellular network supporting a plurality of network nodes associated with a plurality of service providers (SPs), the infrastructure network node comprising processing circuitry configured to:
determine a downlink coordinated precoder for online multi-cell MIMO wireless network virtualization (WNV), the downlink coordinated precoder being based at least on imperfect channel state information (CSI); and
indicate the downlink coordinated precoder.

2. The infrastructure network node of claim 1, wherein the downlink coordinating precoder is a global precoding matrix associated with the plurality of network nodes, the downlink coordinating precoder being configured to reduce an average deviation between the downlink coordinating precoder and at least one virtual local precoder associated with at least one network node.

3. The infrastructure network node of claim 1, wherein each of the plurality of network nodes is associated with a respective SP and respective virtualization demand.

4. The infrastructure network node of claim 3, wherein the downlink coordinated precoding is configured to mitigate inter-SP interference.

5. The infrastructure network node of claim 1, further comprising a plurality of antennas, each of the plurality of network nodes being configured to share the plurality of antennas and wireless spectrum resources with at least one other network node of the plurality of network nodes.

6. The infrastructure network node of claim 1, wherein the downlink coordinated precoder is determined based on a power constraint associated with at least one cell of the online multi-cell MIMO WNV.

7. The infrastructure network node of claim 1, wherein the processing circuitry is further configured to:
store a virtual queue; and
at a second time slot subsequent to a first time slot:
update the virtual queue based on:
imperfect CSI associated with the first time slot,
a state of the virtual queue during the first time slot, and
a downlink coordinated precoder associated with the first time slot;
and determine a downlink coordinated precoder associated with the second time slot based on the updated virtual queue and imperfect CSI associated with the second time slot.

8. The infrastructure network node of claim 7, wherein the processing circuitry is further configured to initialize the virtual queue to zero prior to the first time slot.

9. A method implemented in an infrastructure network node, the infrastructure node providing a virtual multiple-input multiple-output (MIMO) cellular network supporting a plurality of network nodes associated with a plurality of service providers (SPs), the method comprising:
determining a downlink coordinated precoder for online multi-cell MIMO wireless network virtualization (WNV), the downlink coordinated precoder being based at least on imperfect channel state information (CSI); and
indicating the downlink coordinated precoder.

10. The method of claim 9, wherein the downlink coordinating precoder is a global precoding matrix associated with the plurality of network nodes, the downlink coordinating precoder being configured to reduce an average deviation between the downlink coordinating precoder and at least one virtual local precoder associated with at least one network node.

11. The method of claim 9, wherein each of the plurality of network nodes is associated with a respective SP and respective virtualization demand.

12. The method of claim 11, wherein the downlink coordinated precoding is configured to mitigate inter-SP interference.

13. The method of claim 9, wherein each of the plurality of network nodes is configured to share a plurality of antennas and wireless spectrum resources with at least one other network node of the plurality of network nodes.

14. The method of claim 9, wherein the downlink coordinated precoder is determined based on a power constraint associated with at least one cell of the online multi-cell MIMO WNV.

15. The method of claim 9, further comprising:
storing a virtual queue; and
at a second time slot subsequent to a first time slot:
updating the virtual queue based on:
imperfect CSI associated with the first time slot,
a state of the virtual queue during the first time slot, and
a downlink coordinated precoder associated with the first time slot; and
determining a downlink coordinated precoder associated with the second time slot based on the updated virtual queue and imperfect CSI associated with the second time slot.

16. The method of claim 15, further comprising initializing the virtual queue to zero prior to the first time slot.

17. A first network node configured to communicate with an infrastructure network node that is configured to provide a virtual multiple-input multiple-output (MIMO) cellular network supporting a plurality of network nodes associated with a plurality of service providers (SPs), the plurality of network nodes including the first network node, the first network node comprising:
processing circuitry configured to:
determine a virtual local precoder for downlink communication based at least on a local virtualization demand; and
receive an indication of a downlink coordinated precoder for online multi-cell MIMO wireless network virtualization (WNV), the downlink coordinated precoder being based at least on imperfect channel state information (CSI) and the virtual local precoder.

18. The first network node of claim 17, wherein the downlink coordinating precoder is a global precoding matrix associated with the plurality of network nodes, the downlink coordinating precoder being configured to reduce an average deviation between the downlink coordinating precoder and the virtual local precoder associated with the first network node.

19. The first network node of claim 17, wherein each of the plurality of network nodes is associated with a respective SP and respective virtualization demand.

20. The first network node of claim 19, wherein the downlink coordinated precoding is configured to mitigate inter-SP interference.

21. The first network node of claim 17, wherein the first network node is configured to share a plurality of antennas and wireless spectrum resources with at least one other network node of the plurality of network nodes.

22. The first network node of claim 17, wherein the downlink coordinated precoder is based on a power constraint associated with at least one cell of the online multi-cell MIMO WNV.

23. A method implemented in a first network node that is configured to communicate with an infrastructure network node that is configured to provide a virtual multiple-input multiple-output (MIMO), cellular network supporting a plurality of network nodes associated with a plurality of service providers (SPs), the method comprising:
determining a virtual local precoder for downlink communication based at least on a local virtualization demand; and
receiving an indication of a downlink coordinated precoder for online multi-cell MIMO wireless network virtualization (WNV), the downlink coordinated precoder being based at least on imperfect channel state information (CSI) and the virtual local precoder.

24. The method of claim 23, wherein the downlink coordinating precoder is a global precoding matrix associated with the plurality of network nodes, the downlink coordinating precoder being configured to reduce an average deviation between the downlink coordinating precoder and the virtual local precoder associated with the first network node.

25. The method of claim 23, wherein each of the plurality of network nodes is associated with a respective SP and respective virtualization demand.

26. The method of claim 25, wherein the downlink coordinated precoding is configured to mitigate inter-SP interference.

27. The method of claim 23, wherein the first network node is configured to share a plurality of antennas and wireless spectrum resources with at least one other network node of the plurality of network nodes.

28. The method of claim 23, wherein the downlink coordinated precoder is based on a power constraint associated with at least one cell of the online multi-cell MIMO WNV.

* * * * *